US012794512B2

(12) United States Patent
Ly et al.

(10) Patent No.: US 12,794,512 B2
(45) Date of Patent: Nov. 10, 2026

(54) ACTIVE PARTICIPATION OF REFLECTIVE SURFACE IN BEAM SELECTION

(71) Applicant: QUALCOMM Incorporated, San Diego, CA (US)

(72) Inventors: Hung Dinh Ly, San Diego, CA (US); Yu Zhang, San Diego, CA (US); Saeid Sahraei, San Diego, CA (US); Krishna Kiran Mukkavilli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 199 days.

(21) Appl. No.: 18/690,512

(22) PCT Filed: Nov. 25, 2021

(86) PCT No.: PCT/CN2021/132968
§ 371 (c)(1),
(2) Date: Mar. 8, 2024

(87) PCT Pub. No.: WO2023/092367
PCT Pub. Date: Jun. 1, 2023

(65) Prior Publication Data
US 2025/0007564 A1 Jan. 2, 2025

(51) Int. Cl.
*H04B 7/04* (2017.01)
*H04B 7/06* (2006.01)
(Continued)

(52) U.S. Cl.
CPC ....... *H04B 7/04013* (2023.05); *H04B 7/0617* (2013.01); *H04L 5/0051* (2013.01); *H04W 24/10* (2013.01)

(58) Field of Classification Search
CPC .............. H04B 7/04013; H04B 7/0617; H04B 7/0408; H04B 7/0456; H04L 5/0051; H04W 24/10; H04W 72/54; H04W 24/02
See application file for complete search history.

(56) References Cited

U.S. PATENT DOCUMENTS

2008/0152053 A1* 6/2008 Fulghum .............. H04B 7/0854 375/232
2011/0280293 A1 11/2011 Chevalier et al.
(Continued)

FOREIGN PATENT DOCUMENTS

CN 112769719 * 5/2021
CN 112769719 A 5/2021
(Continued)

OTHER PUBLICATIONS

International Search Report and Written Opinion—PCT/CN2021/132968—ISA/EPO—May 25, 2022 (2104191WO1).
(Continued)

*Primary Examiner* — Mewale A Ambaye
(74) *Attorney, Agent, or Firm* — Holland & Hart LLP / Qualcomm

(57) ABSTRACT

Methods, systems, and devices for wireless communications are described. An example method for wireless communication at a reconfigurable reflective surface includes receiving one or more signals from a first wireless device and determining, based at least in part on the one or more signals, measurement information pertaining to a wireless channel between the reconfigurable reflective surface and the first wireless device. The example method may further include determining, based at least in part on the measurement information, a set of weights for a plurality of reflective elements of the reconfigurable reflective surface to be used in reflecting communications between the first wireless device and a second wireless device.

20 Claims, 21 Drawing Sheets

(51) Int. Cl.
*H04L 5/00* (2006.01)
*H04W 24/10* (2009.01)

(56) References Cited

U.S. PATENT DOCUMENTS

| | | | | |
|---|---|---|---|---|
| 2023/0047993 | A1* | 2/2023 | Jian | H04W 72/121 |
| 2023/0176174 | A1* | 6/2023 | Penna | G01S 5/0036 342/451 |
| 2024/0097744 | A1* | 3/2024 | Bhamri | H04B 7/04013 |
| 2024/0120966 | A1* | 4/2024 | Elshafie | H04B 7/0617 |

FOREIGN PATENT DOCUMENTS

| | | | |
|---|---|---|---|
| CN | 112769726 | A | 5/2021 |
| CN | 113630165 | A | 11/2021 |

OTHER PUBLICATIONS

Qualcomm: "NR Smart Repeaters for Rel-18", 3GPP TSG RAN Rel-18, Workshop RWS-210019, Electronic Meeting, Jun. 28-Jul. 2, 2021, 14 Pages.

Shojaeifard A., et al., "LSout to Key SDOs on the Formation of the ISG RIS", RP-212736, ETSI, RIS(21)001003r2, Nov. 16, 2021 (Nov. 16, 2021), pp. 1-4, Section 1.

* cited by examiner

ACTIVE PARTICIPATION OF REFLECTIVE SURFACE IN BEAM SELECTION

CROSS REFERENCE

The present application is a 371 national stage filing of International PCT Application No. PCT/CN2021/132968 by LY et al. entitled "ACTIVE PARTICIPATION OF REFLECTIVE SURFACE IN BEAM SELECTION," filed Nov. 25, 2021, which is assigned to the assignee hereof, and which is expressly incorporated by reference in its entirety herein.

FIELD OF TECHNOLOGY

The following relates to wireless communications, including active participation of a reflective surface in beam selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station may communicate with a UE via a reconfigurable reflective surface to extend a wireless coverage area. In some cases, existing techniques for configuring a reconfigurable reflective surface may be deficient.

SUMMARY

The described techniques relate to improved methods, systems, devices, and apparatuses that support active participation of a reflective surface in beam selection. Generally, the described techniques provide for a reconfigurable reflective surface to select one or more beams (e.g., spatial resources) for communications between two wireless nodes, determine a set of weights corresponding to the one or more beams, and inform the wireless nodes of the selected one or more beams or the set of weights.

A method for wireless communication at a reconfigurable reflective surface is described. The method may include receiving one or more signals from a first wireless device, determining, based on the one or more signals, measurement information pertaining to a wireless channel between the reconfigurable reflective surface and the first wireless device, and determining, based on the measurement information, a set of weights for a set of multiple reflective elements of the reconfigurable reflective surface to be used in reflecting communications between the first wireless device and a second wireless device.

An apparatus for wireless communication at a reconfigurable reflective surface is described. The apparatus may include a processor, memory coupled with the processor, and instructions stored in the memory. The instructions may be executable by the processor to cause the apparatus to receive one or more signals from a first wireless device, determine, based on the one or more signals, measurement information pertaining to a wireless channel between the reconfigurable reflective surface and the first wireless device, and determine, based on the measurement information, a set of weights for a set of multiple reflective elements of the reconfigurable reflective surface to be used in reflecting communications between the first wireless device and a second wireless device.

Another apparatus for wireless communication at a reconfigurable reflective surface is described. The apparatus may include means for receiving one or more signals from a first wireless device, means for determining, based on the one or more signals, measurement information pertaining to a wireless channel between the reconfigurable reflective surface and the first wireless device, and means for determining, based on the measurement information, a set of weights for a set of multiple reflective elements of the reconfigurable reflective surface to be used in reflecting communications between the first wireless device and a second wireless device.

A non-transitory computer-readable medium storing code for wireless communication at a reconfigurable reflective surface is described. The code may include instructions executable by a processor to receive one or more signals from a first wireless device, determine, based on the one or more signals, measurement information pertaining to a wireless channel between the reconfigurable reflective surface and the first wireless device, and determine, based on the measurement information, a set of weights for a set of multiple reflective elements of the reconfigurable reflective surface to be used in reflecting communications between the first wireless device and a second wireless device.

Some examples of the method, apparatuses, and non-transitory computer-readable medium described herein may further include operations, features, means, or instructions for determining, based on the one or more signals, a first spatial resource for the first wireless device to use in communicating with the second wireless device via the reconfigurable reflective surface, and a second spatial resource for the reconfigurable reflective surface to use for the communications that may be from the second wireless device to the first wireless device via the reconfigurable reflective surface and indicating, to at least one of the first wireless device or the second wireless device, a resource identification that may be indicative of at least one of the first spatial resource, the second spatial resource, or the set of weights.

In some examples of the method, apparatuses, and non-transitory computer-readable medium described herein, determining the set of weights may include operations, features, means, or instructions for determining, based on the one or more signals, a first direction for the first wireless device to use in communicating with the second wireless device via the reconfigurable reflective surface, or a second direction for the reconfigurable reflective surface to use for the communications that may be from the second wireless device to the first wireless device via the reconfigurable reflective surface, where the set of weights for the set of multiple reflective elements may be based on the first direction and the second direction.

Some examples of the method, apparatuses, and non-transitory computer-readable medium described herein may further include operations, features, means, or instructions for receiving, from the second wireless device, an acceptance indication associated with the set of weights for at least the set of multiple reflective elements and relaying the communications between the first wireless device and the second wireless device using the set of weights.

In some examples of the method, apparatuses, and non-transitory computer-readable medium described herein, receiving the one or more signals from the first wireless device may include operations, features, means, or instructions for receiving a measurement report from the first wireless device.

In some examples of the method, apparatuses, and non-transitory computer-readable medium described herein, determining the measurement information pertaining to the wireless channel between the reconfigurable reflective surface and the first wireless device may include operations, features, means, or instructions for determining the measurement information based on information included in the measurement report.

In some examples of the method, apparatuses, and non-transitory computer-readable medium described herein, the measurement report may be based on a multi-shot channel state information reference signal measurement triggered by a downlink control information from the second wireless device, the measurement report including reference signal received power measurements for respective shots of a channel state information reference signal.

In some examples of the method, apparatuses, and non-transitory computer-readable medium described herein, receiving the one or more signals from the first wireless device may include operations, features, means, or instructions for receiving the measurement report via an uplink control channel message or an uplink shared channel message from the first wireless device on time domain and frequency domain resources previously provided to the reconfigurable reflective surface.

In some examples of the method, apparatuses, and non-transitory computer-readable medium described herein, receiving the one or more signals from the first wireless device may include operations, features, means, or instructions for receiving the measurement report via a dedicated control channel between the first wireless device and the reconfigurable reflective surface.

Some examples of the method, apparatuses, and non-transitory computer-readable medium described herein may further include operations, features, means, or instructions for monitoring a set of multiple dedicated control channels that may be each between respective first wireless devices and the reconfigurable reflective surface, the dedicated control channel between the first wireless device and the reconfigurable reflective surface being one of the set of multiple dedicated control channels.

In some examples of the method, apparatuses, and non-transitory computer-readable medium described herein, the measurement report includes an identification of the first wireless device.

In some examples of the method, apparatuses, and non-transitory computer-readable medium described herein, receiving the one or more signals from the first wireless device may include operations, features, means, or instructions for receiving the one or more signals as one or more sounding reference signals on a set of uplink transmission resources reserved for supporting the reconfigurable reflective surface in deriving the set of weights.

In some examples of the method, apparatuses, and non-transitory computer-readable medium described herein, determining the measurement information pertaining to the wireless channel between the reconfigurable reflective surface and the first wireless device may include operations, features, means, or instructions for measuring the one or more sounding reference signals and deriving the measurement information from the measuring.

In some examples of the method, apparatuses, and non-transitory computer-readable medium described herein, each of the one or more sounding reference signals corresponds to a transmit beam from the first wireless device.

Some examples of the method, apparatuses, and non-transitory computer-readable medium described herein may further include operations, features, means, or instructions for receiving, from the second wireless device, an override indication associated with the set of weights for at least the set of multiple reflective elements and updating the set of weights for at least the set of multiple reflective elements of the reconfigurable reflective surface based on the override indication.

Some examples of the method, apparatuses, and non-transitory computer-readable medium described herein may further include operations, features, means, or instructions for receiving one or more additional signals from the second wireless device, where updating the set of weights may be further based on the one or more additional signals.

In some examples of the method, apparatuses, and non-transitory computer-readable medium described herein, the set of weights for at least the set of multiple reflective elements include passive multiple-input multiple-output weights.

In some examples of the method, apparatuses, and non-transitory computer-readable medium described herein, each weight of the set of weights maps a control voltage for a reflective element of the set of multiple reflective elements.

A method for wireless communication at a first wireless device is described. The method may include transmitting, to a reconfigurable reflective surface, an indication of resources for monitoring for one or more signals from a second wireless device, where the one or more signals relates to measurement information pertaining to a wireless channel between the second wireless device and the reconfigurable reflective surface and receiving a resource identification that is indicative of a set of weights for a set of multiple reflective elements of the reconfigurable reflective surface based on the one or more signals.

An apparatus for wireless communication at a first wireless device is described. The apparatus may include a processor, memory coupled with the processor, and instructions stored in the memory. The instructions may be executable by the processor to cause the apparatus to transmit, to a reconfigurable reflective surface, an indication of resources for monitoring for one or more signals from a second wireless device, where the one or more signals relates to measurement information pertaining to a wireless channel between the second wireless device and the reconfigurable reflective surface and receive a resource identification that is indicative of a set of weights for a set of multiple reflective elements of the reconfigurable reflective surface based on the one or more signals.

Another apparatus for wireless communication at a first wireless device is described. The apparatus may include means for transmitting, to a reconfigurable reflective surface, an indication of resources for monitoring for one or more more signals from a second wireless device, where the one or more signals relates to measurement information pertaining to a wireless channel between the second wireless device and the reconfigurable reflective surface and means for receiving a resource identification that is indicative of a set of weights for a set of multiple reflective elements of the reconfigurable reflective surface based on the one or more signals.

A non-transitory computer-readable medium storing code for wireless communication at a first wireless device is described. The code may include instructions executable by a processor to transmit, to a reconfigurable reflective surface, an indication of resources for monitoring for one or more signals from a second wireless device, where the one or more signals relates to measurement information pertaining to a wireless channel between the second wireless device and the reconfigurable reflective surface and receive a resource identification that is indicative of a set of weights for a set of multiple reflective elements of the reconfigurable reflective surface based on the one or more signals.

In some examples of the method, apparatuses, and non-transitory computer-readable medium described herein, the resource identification further indicates at least one of a first spatial resource for the first wireless device to use in communicating with the second wireless device via the reconfigurable reflective surface or a second spatial resource for the reconfigurable reflective surface to use for communications that may be from the second wireless device to the first wireless device via the reconfigurable reflective surface.

In some examples of the method, apparatuses, and non-transitory computer-readable medium described herein, the wireless channel may be a first wireless channel and the method, apparatuses, and non-transitory computer-readable medium may include further operations, features, means, or instructions for transmitting, to the reconfigurable reflective surface, one or more additional signals indicating information related to a second wireless channel between the first wireless device or a third wireless device and the reconfigurable reflective surface.

Some examples of the method, apparatuses, and non-transitory computer-readable medium described herein may further include operations, features, means, or instructions for transmitting, to the reconfigurable reflective surface, an override indication associated with the resource identification.

Some examples of the method, apparatuses, and non-transitory computer-readable medium described herein may further include operations, features, means, or instructions for transmitting downlink control information to the second wireless device to trigger one or more channel state information reference signal measurements at the second wireless device, where the one or more signals may be based on the one or more channel state information reference signal measurements.

A method for wireless communication at a first wireless device is described. The method may include receiving, from a second wireless device, an indication of one or more resources for transmitting one or more signals, where the one or more signals relate to a wireless channel between the first wireless device and a reconfigurable reflective surface and transmitting, to the reconfigurable reflective surface, the one or more signals using the one or more resources.

An apparatus for wireless communication at a first wireless device is described. The apparatus may include a processor, memory coupled with the processor, and instructions stored in the memory. The instructions may be executable by the processor to cause the apparatus to receive, from a second wireless device, an indication of one or more resources for transmitting one or more signals, where the one or more signals relate to a wireless channel between the first wireless device and a reconfigurable reflective surface and transmit, to the reconfigurable reflective surface, the one or more signals using the one or more resources.

Another apparatus for wireless communication at a first wireless device is described. The apparatus may include means for receiving, from a second wireless device, an indication of one or more resources for transmitting one or more signals, where the one or more signals relate to a wireless channel between the first wireless device and a reconfigurable reflective surface and means for transmitting, to the reconfigurable reflective surface, the one or more signals using the one or more resources.

A non-transitory computer-readable medium storing code for wireless communication at a first wireless device is described. The code may include instructions executable by a processor to receive, from a second wireless device, an indication of one or more resources for transmitting one or more signals, where the one or more signals relate to a wireless channel between the first wireless device and a reconfigurable reflective surface and transmit, to the reconfigurable reflective surface, the one or more signals using the one or more resources.

In some examples of the method, apparatuses, and non-transitory computer-readable medium described herein, transmitting the one or more signals may include operations, features, means, or instructions for transmitting a measurement report to the reconfigurable reflective surface.

Some examples of the method, apparatuses, and non-transitory computer-readable medium described herein may further include operations, features, means, or instructions for measuring the wireless channel using a multi-shot channel state information reference signal measurement triggered by a downlink control information from the second wireless device, the measurement report including reference signal received power measurements for respective shots of a channel state information reference signal.

Some examples of the method, apparatuses, and non-transitory computer-readable medium described herein may further include operations, features, means, or instructions for measuring the wireless channel using a sounding reference signal.

Some examples of the method, apparatuses, and non-transitory computer-readable medium described herein may further include operations, features, means, or instructions for receiving a resource identification from the reconfigurable reflective surface, where transmitting the one or more signals may be based on the resource identification.

DETAILED DESCRIPTION

Figure 1:
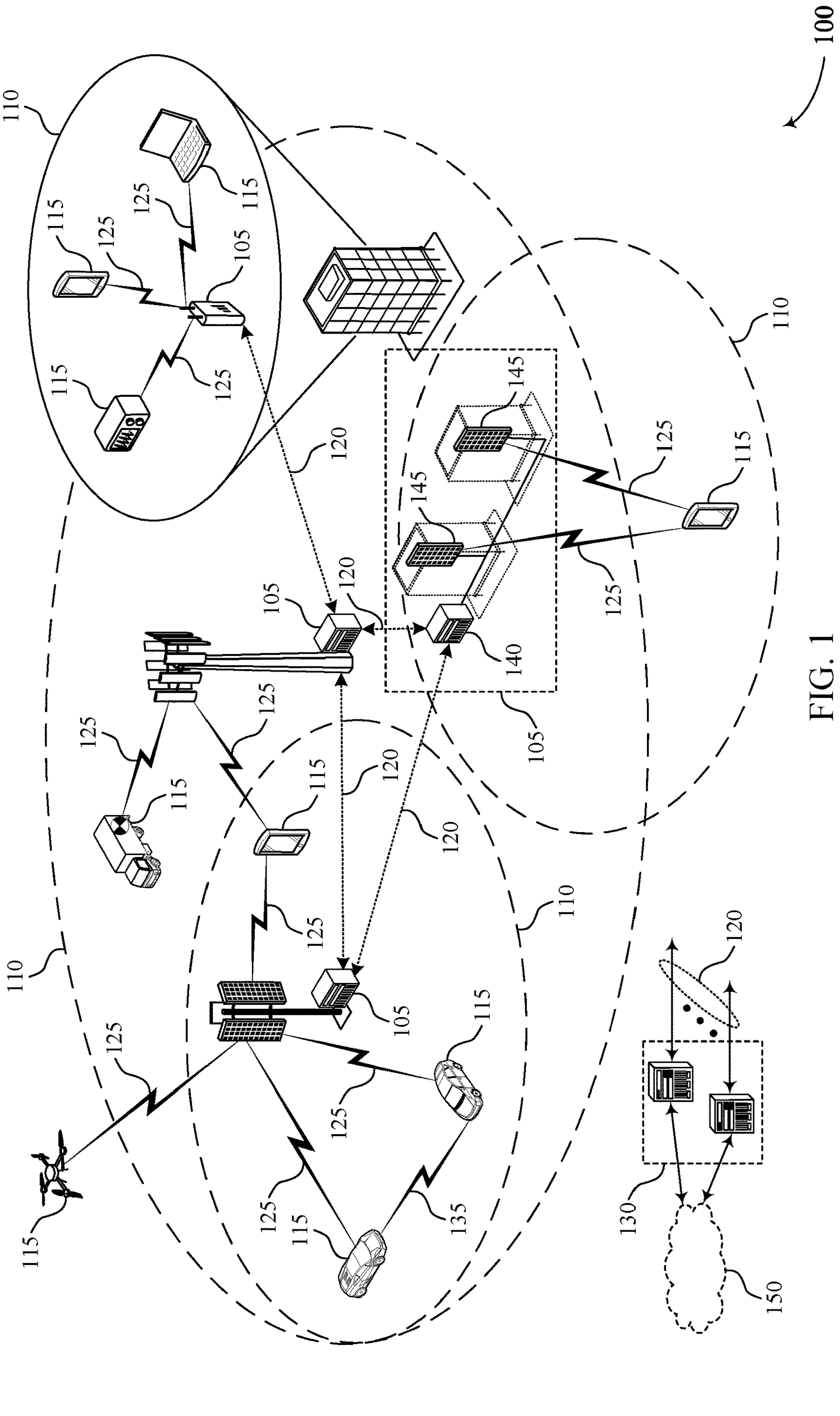
FIGS. 1 through 3 illustrate examples of a wireless communications system that supports active participation of a reflective surface in beam selection in accordance with aspects of the present disclosure.

A wireless communications system may support communications between base stations and UEs via active reflective surfaces. A device with an active reflective surface may be referred to as a reconfigurable reflective surface or a reconfigurable intelligent surface (RIS). An RIS may also be referred to as a passive multiple-input multiple-output (P-MIMO). Such devices may be used to extend coverage to areas that may be otherwise without coverage. An RIS may include a set of reflective elements which may be used to reflect wireless signals from a transmitter (e.g., a base station) to a receiver (e.g., a UE) according to a configuration of the reflective elements of the RIS. The RIS may then use the configuration to reflect signals transmitted from the base station towards the target UE and, similarly, reflect signals transmitted from the target UE to the base station. Techniques described herein enable the RIS to determine its own configuration and passively inform the configuration to a base station, which may be a much smaller transmission than that required if the base station were to configure the RIS. The RIS may use passive communication techniques because it may not include power amplifiers and thus not have direct transmission capability.

Techniques described herein enable an RIS with receive capability to autonomously determine a configuration for its reflective elements. The RIS may receive an indication of channel resources from a base station to monitor for control information from a UE. The RIS may receive the control information, which may provide information regarding a wireless channel between the UE and the RIS that is based on channel measurements made by the UE (e.g., from a channel state information reference signal (CSI-RS) or a sounding reference signal (SRS)). The process may include a downlink-based framework and an uplink based framework. In the downlink-based framework, the base station may transmit reference signals that are measured by the UE, and then the UE transmits, as control information, a measurement report to the RIS. Using information in the measurement report, the RIS may determine one or more spatial resources and weights for at least a subset of its reflective elements. The weights should reflect any incoming signals from the base station to the UE, and vice-versa. In the uplink-based framework, the UE may transmit reference signals (for example, SRS) towards the RIS. The RIS may measure the reference signals and determine its own measurements from which to determine the one or more spatial resources and the weights.

The RIS may inform the base station or the UE of a resource identification related to the one or more spatial resources or the weights. However, because the RIS does not have all of the information about the wireless environment, the one or more spatial resources or the weights may be detrimental to the wireless environment, such as it may cause interference for other wireless nodes. If so, the base station may override the one or more spatial resources or the weights by sending an override signal. The base station may also possibly provide more information to the RIS for a different selection of the spatial resources and weights. Upon receiving the override signal, the RIS may determine updated spatial resources and weights based on new information. In some cases, the RIS may determine spatial resources or weights for a second set of reflective elements for communications with a second UE.

Aspects of the disclosure are initially described in the context of wireless communications systems. Aspects of the disclosure are further described in the context of block diagrams and process flows. Aspects of the disclosure are further illustrated by and described with reference to apparatus diagrams, system diagrams, and flowcharts that relate to active participation of a reflective surface in beam selection.

FIG. 1 illustrates an example of a wireless communications system 100 that supports active participation of a reflective surface in beam selection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a ULE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term “cell” may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the base station 105 may include a base station communications manager. The base station 105 may transmit, to a reconfigurable reflective surface, an indication of resources for monitoring for one or more signals from a second wireless device, wherein the one or more signals relates to measurement information pertaining to a wireless channel between the second wireless device and the reconfigurable reflective surface. The base station 105 may receive a resource identification that is indicative of a set of weights for a plurality of reflective elements of the reconfigurable reflective surface based at least in part on the one or more signals.

In some examples, the UE 115 may include a UE communications manager. The UE 115 may receive, from a second wireless device, an indication of one or more resources for transmitting one or more signals, wherein the one or more signals relate to a wireless channel between the first wireless device and a reconfigurable reflective surface. The UE 115 may transmit, to the reconfigurable reflective surface, the one or more signals using the one or more resources.

In some examples, the wireless communications system 100 may support one or more aspects of the techniques for active participation of a reflective surface, such as an RIS, in beam selection. For example, a RIS may receive one or more signals from a first wireless device, such as a base station 105 or a UE 115. In some examples, the RIS may determine, based at least in part on the one or more signals, measurement information pertaining to a wireless channel between the reconfigurable reflective surface and the first wireless device. In some cases, the RIS may determine, based at least in part on the measurement information, a set of weights for a plurality of reflective elements of the reconfigurable reflective surface to be used in reflecting communications between the first wireless device and a second wireless device, such as a UE 115 or a base station 105.

Figure 2:
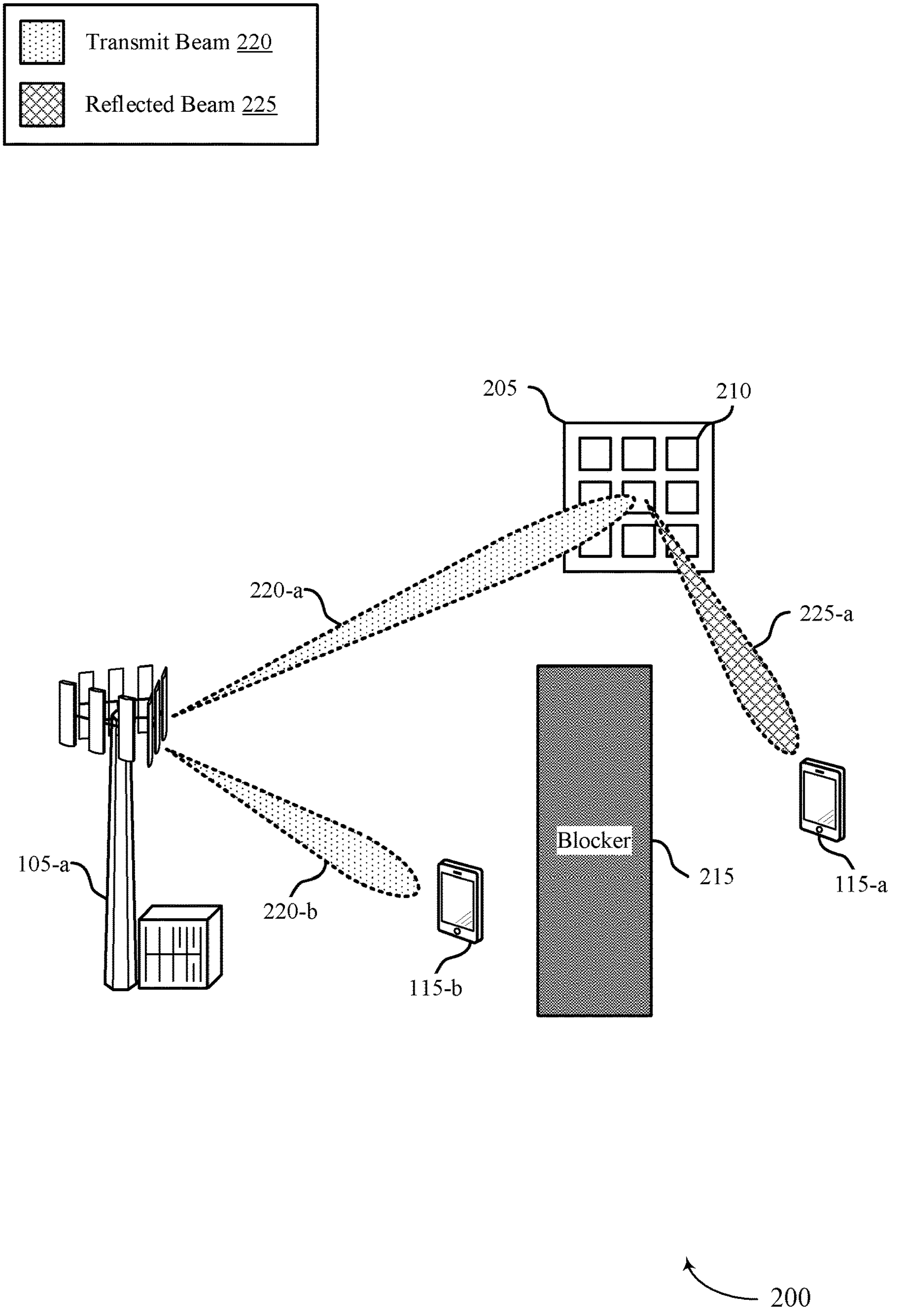

FIG. 2 illustrates an example of a wireless communications system 200 that supports active participation of a reflective surface in beam selection in accordance with aspects of the present disclosure. In some examples, wireless communications systems 200 may implement aspects of wireless communications system 100. For instance, the wireless communications system 200 may include a base station 105 and one or more UEs 115, which may be examples of the corresponding devices described with reference to FIG. 1. The wireless communications system 200 may include features for improved communications between the UEs 115 and the base station 105, among other benefits.

The wireless communications system 200 illustrates communications between the base station 105-*a* and a UE 115-*a* in the presence of a blocker 215. The blocker 215 may represent a physical obstruction, signal fading, or any other phenomenon or combination of phenomena that may cause communications between the base station 105-*a* and the UE 115-*a* to experience signal loss or interference. In this example, the blocker 215 may be a physical obstruction (e.g., buildings, mountains, people, etc.) positioned such that direct communications between the UE 115-*a* and the base station 105-*a* may be impacted, such as by experiencing signal loss or interference. Signal loss or interference may be determined by the network, the UE 115-*a*, the base station 105-*a*, or any combination thereof.

The wireless communications system 200 also illustrates communications between the base station 105-*a* and a UE 115-*b* in the absence of the blocker 215. That is, there is no blocker 215 obstructing communications between the base station 105-*a* and the UE 115-*b*. In the absence of the blocker 215, a base station 105-*a* may directly transmit signals to the UE 115-*b* via a transmit beam 220-*b*. This is in contrast with the direct path between the UE 115-*a* and the base station 105-*a* that is obstructed by the blocker 215, where the base station 105-*a* may be unable to directly transmit signals to the UE 115-*a*. Additionally, it should be understood that the techniques described herein may be applicable with or without the blocker 215.

In some cases, to correct signal loss or to otherwise improve the efficiency or reliability of the wireless connection between the base station 105-*a* and the UE 115-*a*, the base station 105-*a* may utilize additional wireless nodes, such as a reconfigurable reflective surface like an RIS 205, to extend coverage and enhance communications with the UE 115-*a*. For example, the base station 105-*a* may extend coverage and enhance communications with the UE 115-*a* through the use of active devices or near passive devices that may propagate signals between the base station 105-*a* and the UE 115-*a*. In some examples, active or near passive devices may be used to achieve high beamforming gain. In some cases, a base station 105 may employ active or near passive devices for both uplink and downlink communications with the UE 115-*a* in order to circumvent the blocker 215 or for other communication enhancement purposes.

An active unit, such as an active antenna unit (AAU), may include individual radio frequency chains per antenna port and, as a result, may be associated with a significant increase in power consumption. In contrast, near passive units, such as the RIS 205, may be deployed in the wireless network to extend coverage with negligible power consumption. The RIS 205 may be referred to as a near passive device, for example, because the RIS 205 may not be configured with active antennas or associated radio frequency circuitry to support the antennas. Instead, the RIS 205 may include a set of reflective elements 210 (e.g., reconfigurable reflective elements) which may be used to reflect an incoming signal from a transmitting device towards a receiving device, according to a configuration of the plurality of reflective elements. The configuration may include a set of weights to adjust the reflective elements 210 included in the RIS 205. Each weight of the set of weights may map a control voltage for a reflective element 210 of the set of reflective elements. The weight may adjust a positioning of the reflective element 210, which may adjust the direction of reflection towards a target. For example, the weights may be determined such that at least some of the reflective elements 210 reflect incoming signals from the base station 105-*a* towards the UE 115-*a*.

The set of weights may be determined at the RIS 205 based at least in part on measurement information about a wireless channel between the RIS 205 and the UE 115-*a* or between the RIS 205 and the base station 105-*a*. The RIS 205 may have a receiver which can receive incoming signals from a wireless device such as the base station 105-*a* and the UE 115-*a*. The RIS 205 may monitor for measurement information on a control channel, which may be a dedicated control channel. The RIS 205 may determine channel measurements from the measurement information, and from the channel measurements determine a set of weights to reflect signals to a wireless device.

For example, a RIS 205 may monitor for a control message (e.g., including control channel information) from the base station 105-*a*. The RIS 205 may receive one or more signals indicating the control channel to monitor for measurement information. The RIS 205, based on the monitoring, may receive one or more signals from the base station 105-*a* or the UE 115-*a*. The RIS 205 may determine, based at least in part on the one or more signals, measurement information pertaining to a wireless channel between the RIS 205 and the wireless device pertaining to the measurement information. The RIS 205 may further determine, based at least in part on the measurement information, a set of weights for a plurality of reflective elements of the RIS 205 to be used in reflecting communications between the base station 105-*a* and the UE 115-*a*.

Figure 3:
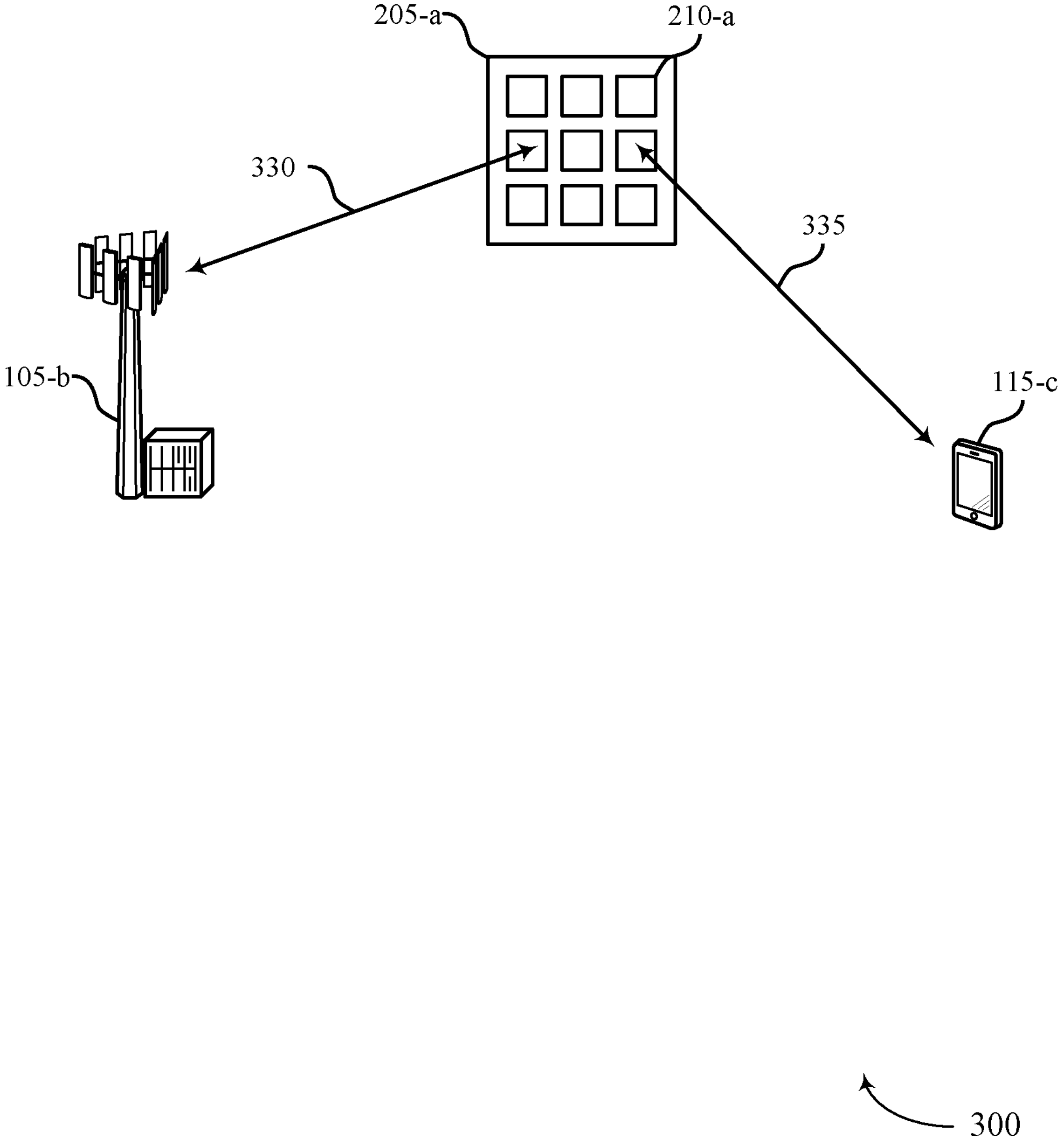

FIG. 3 illustrates an example of a wireless communications system 300 that supports active participation of a reflective surface in beam selection in accordance with aspects of the present disclosure. In some examples, wireless communications systems 300 may implement aspects of wireless communications systems 100 and 200. For instance, the wireless communications system 300 may include a base station 105-*b*, a UE 115-*c*, and a RIS 205-*a* which may be examples of the corresponding devices described with reference to FIGS. 1 and 2. The wireless communications system 300 may include features for improved communications between the UE 115-*c* and the base station 105-*b*, among other benefits.

Wireless communications system 300 may include a RIS 205-*a* that includes a set of M reconfigurable reflective elements (e.g., components), including a reflective element 210-*a*. Each element of the RIS 205-*a* may be configured to redirect (e.g., reflect, refract, or diffract) communications from the UE 115-*c* to the base station 105-*b* and, similarly, from the base station 105-*b* to the UE 115-*c*. The direction of the reflected beam may be controllable by the RIS 205-*a* or by the base station 105-*b*. The RIS 205-*a* may be a near passive device with receive capability. If the RIS 205-*a* is capable of receiving signals, it can use received information to determine weights and send an indication related to the determined weights so that the base station 105-*b* and the UE 115-*c* can receive each other's transmissions.

The RIS 205-*a* may have a level of independence such that it can actively participate in beam selection. The RIS 205-*a* may have receive capability so that the RIS 205-*a* may receive control or measurement information from the base station 105-*b* or the UE 115-*c*.

The RIS 205-*a* may determine a set of weights for at least a some of the reflective elements 210-*a*. The weights may correspond to a redirect (e.g., reflection, etc.) direction to serve a particular UE, such as the UE 115-*c*. The RIS 205-*a* may be able to determine the correct reflection direction (e.g., any direction that aids in the proper reception of signals between at least two wireless devices). Thus, the RIS 205-*a* may determine the weights independently and the base station 105-*b* does not have to figure out the control voltage to apply to the different reflective elements for the RIS 205-*a*. The set of weights may map a control voltage to a reflective element so that each reflective element points in the correct direction. The RIS 205-*a* may inform the other nodes (e.g., the base station 105-*b* and the UE 115-*c*) of the weights.

The base station 105-*b* may send one or more signals 330 to the RIS 205-*a*. The one or more signals 330 may indicate control channel information. In some examples, the base station 105-*b* may transmit information such as a reflection configuration, scheduling information, identity of the UE to be communicated with, approximate location of the UE to be communicated with, information on whether the RIS is causing interference, a power down or power up request to the RIS 205-*a*. The RIS 205-*a* may acknowledge receipt of the one or more signals 330 to the base station 105-*b* using various passive communication techniques.

Techniques described herein include a downlink-based approach and an uplink-based approach for determining the weights. In the downlink-based approach, the base station 105-*b* may configure the UE 115-*c* in order to measure a set of resources (e.g., CSI-RS resources). The UE 115-*c* may perform channel measurements using the set of resources. The base station 105-*b* may send the UE 115-*c* a single downlink control information (DCI) to trigger a multi-shot CSI-RS measurement. The base station 105-*b* may inform the UE 115-*c* that it will send n CSI-RS resources (wherein n is a positive integer) that are time division multiplexed, and request the UE 115-*c* to perform channel measurements on each resource separately. The UE 115-*c* may perform channel measurements using the n CSI-RS resources, for example, the UE 115-*c* may measure RSRP for each resource separately. The UE 115-*c* may pack the n RSRPs into one report. The UE 115-*c* may then send the report, which includes the information related to the measurements, to the RIS 205-*a* or to the base station 105-*b*. The UE 115-*c* may send one or more signals 335 to the RIS 205-*a* that may include the report or other information related to the channel measurements.

The UE 115-*c* may report this information either using an existing channel or a dedicated UE-to-RIS channel. If the UE 115-*c* uses an existing channel, the UE 115-*c* does not need to know if it is reporting the information to the RIS 205-*a* or to the base station 105-*b*. For example, the UE 115-*c* may send the report using a physical uplink shared channel (PUSCH) or a physical uplink control channel (PUCCH). This process may be transparent to the UE 115-*c*. However, the RIS 205-*a* may need to be able to determine the information about the uplink resource, such as the time-frequency tracking and other information to decode the PUSCH or PUCCH. That is, the RIS 205-*a* may need to know when the UE 115-*c* will receive the report so the RIS 205-*a* may decode the measurement information.

If the UE 115-*c* uses a dedicated UE-to-RIS channel, this technique may not be transparent to the UE 115-*c*. In this alternative, the base station 105-*b* may reserve some uplink resources (which may be shared among multiple UEs), and the RIS 205-*a* may need to be aware of the uplink resources as well. The uplink resources may correspond to a new channel between the RIS 205-*a* and the UE 115-*c*. The base station 105-*b* or the UE 115-*c* may report the new channel information to the RIS 205-*a*. The RIS 205-*a* may decode the channel information in order to receive the measurement information.

In the uplink-based approach, the base station 105-*b* may configure the UE 115-*c* with a set of resources for uplink transmissions for supporting the RIS 205-*a* to have control to derive the weights. Each resource of the set of resources for uplink transmission may correspond to a beam, such as a sounding reference signal (SRS). In some examples, the UE 115-*c* may perform beam sweeping while transmitting the SRS. For example, each SRS may be transmitted in a different direction, for example.

The RIS 205-*a* may perform measurements based on the uplink transmissions, such as RSRP measurements. Based on the received measurements, the RIS 205-*a* may select the suitable spatial direction for beam-forming the signal to the UE 115-*c* or may select the suitable spatial direction for the UE 115-*c* to transmit the signal. For example, the suitable spatial direction may be based on the strongest RSRP. Furthermore, the RIS 205-*a* may derive the weights corresponding to the selected spatial direction.

Regardless of whether the uplink or downlink approach is used, the RIS 205-*a* may determine the correct beam (e.g., which direction beams need to be reflected in to aid communications) based on the received measurements. That beam direction may be mapped to the appropriate control voltage for each reflective element 210-*a*. When the UE 115-*c* is configured with multiple CSI-RS resources, the RIS 205-*a* may have a different configuration pertaining to each of those CSI-RS resources. The UE 115-*c* may be able to determine which beam is best (e.g., the strongest signal reflected back to the UE 115-*c*).

The RIS 205-*a* may use that information to figure out the correct configuration. That is, the RIS 205-*a* may determine the correct beam based on which beam is strongest. The RIS 205-*a* may select the suitable spatial direction for beamforming the signal to the UE 115-*c* or selects the suitable spatial direction for the UE 115-*c* to transmit the signal. Furthermore, the RIS 205-*a* may derive the weights corresponding to the selected spatial direction. In some examples, the spatial resources may be used by the nodes to determine beamforming directions for signal transmissions.

The RIS 205-*a* may determine a resource identification based at least in part on the one or more signals 335. In some examples, the resource identification may be a beam index. In some examples, the resource identification may be a small number of bits. The RIS 205-*a* may send the resource identification to one or both of the base station 105-*b* and the UE 115-*b*. The base station 105-*b* and the UE 115-*b* may receive the resource identification and use it to determine how to send and receive signals to the other wireless node.

In some examples, the base station 105-*b* may accept the one or more spatial direction and report the acceptance to at least one of the RIS 205-*a* or the UE 115-*c*. In some examples, the RIS 205-*a* or the UE 115-*c* may use the selected beams without receiving a confirmation from the base station 105-*b*.

In some examples, the base station 105-*b* may override the beam or set of weights selected by the RIS 205-*a*. For example, the RIS 205-*a* may be unaware of other nodes in proximity which may be affected by the beam or set of weights selected by the RIS 205-*a*. If the base station 105-*b* is aware that the beam or set of weights selected by the RIS 205-*a* may cause interference with another UE, the base station 105-*b* may send the RIS 205-*a* an override signal. The override signal may indicate to the RIS 205-*a* that the set of weights or the beam are not accepted and to not use them. In that case, the RIS 205-*a* may select another set of weights or beam and send an updated resource identification. For example, the RIS 205-*a* may select a next-best beam for the communications. In some examples, the base station 105-*b* may send one or more signals to the RIS 205-*a* that provides more information for the RIS 205-*a* to select the beam.

In some examples, the RIS 205-*a* may aid in sidelink communications between two UEs using the techniques described herein.

In some examples, the RIS 205-*a* may only use a subset of all of its reflective elements to serve communications between the base station and the UE 115-*c*. The RIS 205-*a* may use another subset of the reflective elements to serve communications between the base station and a different UE. The same techniques described herein may be used to determine a different set of weights for a different UE. In some examples, an RIS may serve more than two UEs and one or more base stations at the same time. For example, the RIS 205-*a* may have two or more panels, and each panel may be used for a different UE.

Techniques described herein reduce the amount of data that needs to be transmitted between the base station 105-*b* and the RIS 205-*a*. For example, the control channel between the base station 105-*b* and the RIS 205-*a* may be very light-weight because the RIS 205-*a* may send only a resource identification that is indicative of at least one of the set of weights, a first spatial resource, or a second spatial resource. Without the ability of the RIS 205-*a* to independently determine the weights, the base station 105-*b* may have to send control voltage levels for each of the applicable reflective elements of the RIS 205-*a* (which may be, for example, more than a thousand individual reflective elements). Sending these control voltages over a control channel is substantially more data transmission than the RIS 205-*a* sending a resource identification.

Figure 4A:
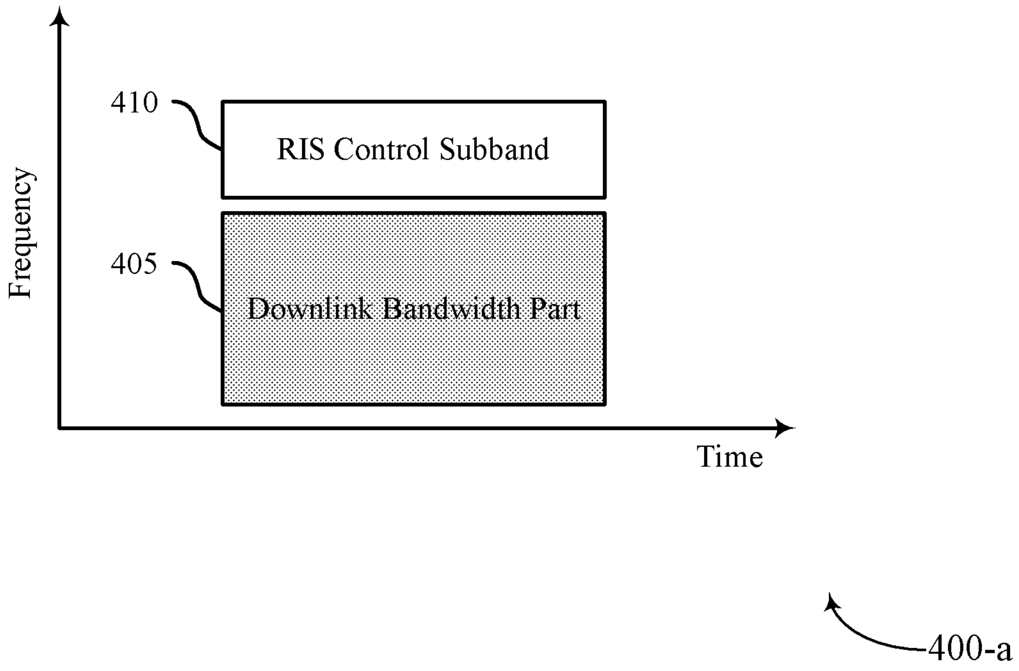
FIGS. 4A and 4B illustrate examples of a diagram that supports active participation of a reflective surface in beam selection in accordance with aspects of the present disclosure.

FIG. 4A illustrates an example of a diagram 400-*a* that supports active participation of a reflective surface in beam selection in accordance with aspects of the present disclosure. In some examples, the diagram 400-*a* may be implemented in aspects of wireless communications systems 100, 200, and 300. The diagram 400-*a* illustrates an example of a possible control channel between a base station, a UE, and an RIS. In the example of FIG. 4A, a sequence-based control channel is illustrated as a function of frequency over time. The sequence-based control channel may include a downlink bandwidth part 405 and a control sub-band 410, which may not overlap. This example may be used with the uplink-based approach.

For example, an uplink control channel (e.g., PUCCH format 0) may be a sequence-based channel. A reason sequence-based control channels may be selected may include that there are very few bits of information that the UE has to transmit to the base station. For example, when the UE wants to send an acknowledgement (ACK) or a negative acknowledgment (NACK) to the base station, it may include just a single bit. The sequence-based approach may be very robust in the presence of a frequency error or a timing error. The base station or the UE may use the sequence-based channel to send information to an RIS.

Figure 4B:
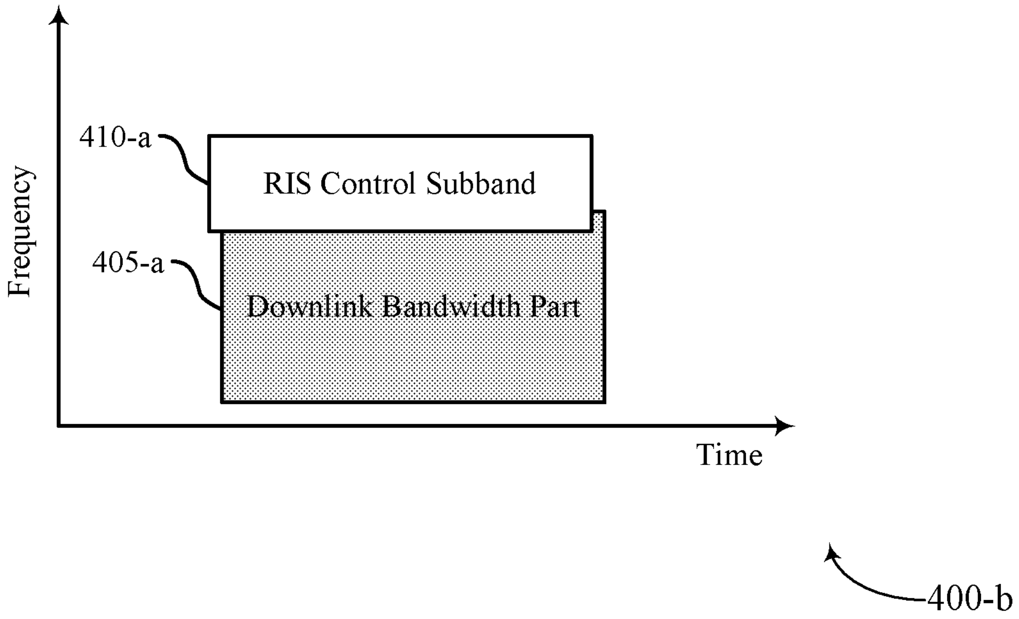

FIG. 4B illustrates an example of a diagram 400-*b* that supports active participation of a reflective surface in beam selection in accordance with aspects of the present disclosure. In some examples, the diagram 400-*b* may be implemented in aspects of wireless communications systems 100, 200, and 300. The diagram 400-*b* illustrates an example of a possible control channel between a base station, UE, and an RIS. In the example of FIG. 4B, a physical downlink control channel (PDCCH)-based control channel is illustrated as a function of frequency over time. The PDCCH-based control channel may include a downlink bandwidth part 405-*a* and a RIS control sub-band 410-*a*, which may overlap.

The PDCCH-based control channel may be selected when there is a large control channel, such as that which is used between a base station and a UE. The information from the base station to the RIS could be transmitted in a BWP that is different from the BWP that the base station uses to communicate with the UE. In some examples, there may be overlap in the BWP. For example, if there is overlap in two sub-bands (for example, the BWP that is for communicating with the UE and the BWP that the base station uses in communicating with the RIS), the UE may be aware of the overlap so that so the UE can rate-match around the sub-carriers. In some examples, the base station may make the UE aware of the overlap.

Figure 5:
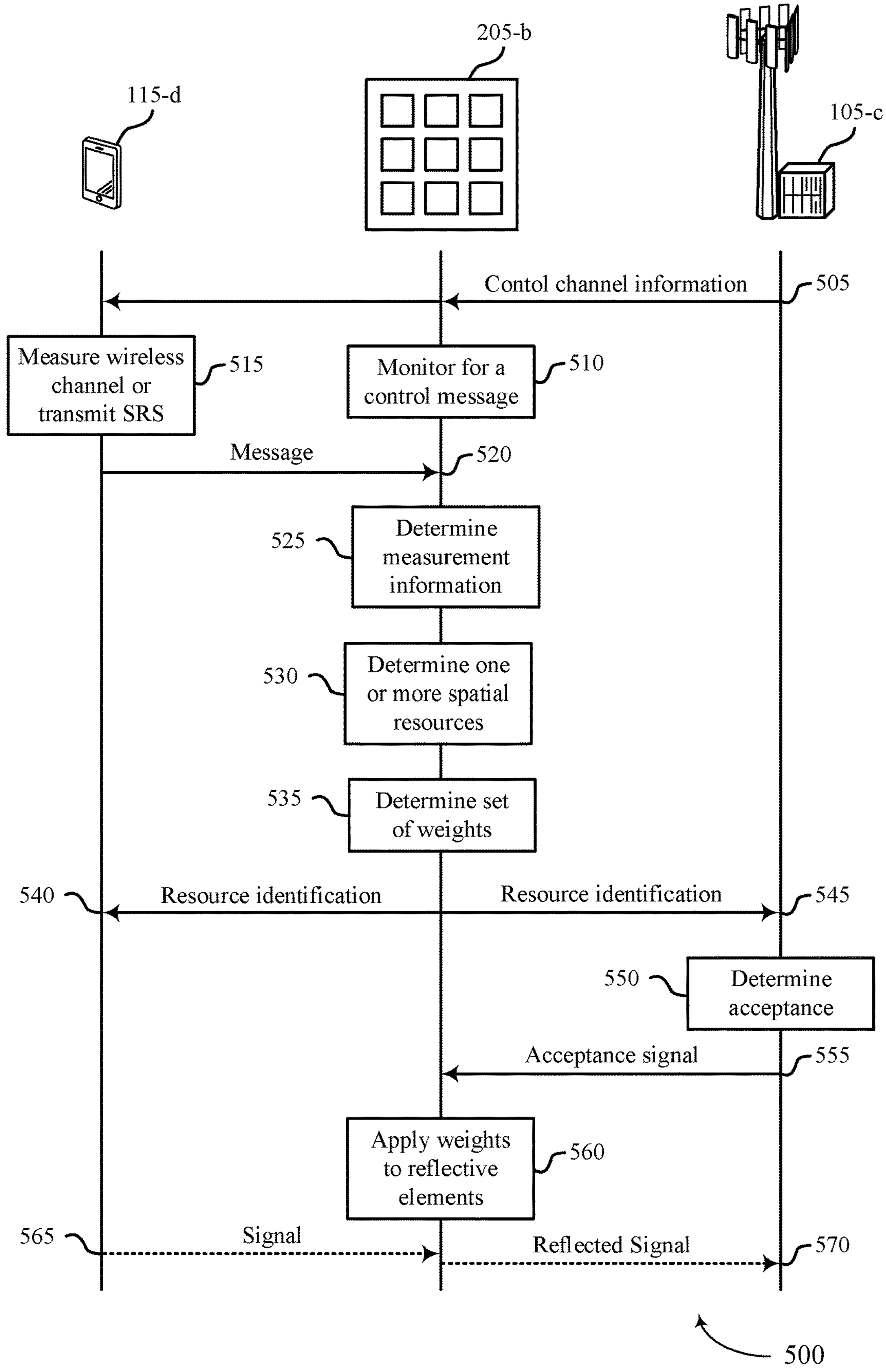
FIG. 5 illustrates an example of a flow diagram that supports active participation of a reflective surface in beam selection in accordance with aspects of the present disclosure.

FIG. 5 illustrates an example of a flow diagram 500 that supports active participation of a reflective surface in beam selection in accordance with aspects of the present disclosure. In some examples, the flow diagram 500 may implement aspects of wireless communications systems 100, 200, and 300. For instance, the flow diagram 500 may include a base station 105-*c*, a UE 115-*d*, and a RIS 205-*b* which may be examples of the corresponding devices described with reference to FIGS. 1-3. The flow diagram 500 may include features for improved communications between the UE 115-*d* and the base station 105-*c*, among other benefits. The example of FIG. 5 may apply to the uplink-based approach or the downlink-based approach described above.

At 505, the base station 105-*c* may send control channel information to the RIS 205-*b* and possibly to the UE 115-*d* as well. The control channel information may indicate to the RIS 205-*b* which channels to monitor for measurement information to be used to determine the weights. In some examples, the UE 115-*d* or the RIS 205-*b* may already be pre-configured with this information.

At 515, the UE 115-*d* may measure the wireless channel using a one-shot CSI-RS (e.g., downlink-based approach) or by transmitting SRSs over a set of resources (e.g., uplink-based approach). The RIS 205-*b* may be monitoring the control channel at 510 for the measurement information. The measurement information may be a measurement report, sent as message 520, or may be the SRS signals themselves (which the RIS 205-*b* would measure and determine the channel metrics). At 525, the RIS 205-*b* determines the measurement information either from the measurement report message 520 or from the SRSs.

At 530, the RIS 205-*b* may determine one or more spatial resources from the channel measurements. At 535, the RIS 205-*b* may determine the set of weights from the channel measurements, which may be based on the selected one or more spatial resources. At 540 and 545, the RIS 205-*b* may send a resource identification to the UE 115-*d* and the base station 105-*c*. The resource identification may be passively sent.

At 550, the base station 105-*c* may determine whether the one or more spatial resources and the weights are acceptable. They may be acceptable if they do not cause interference with other nodes, or for other reasons. If so, the base station 105-*c* may send an acceptance signal 555 to the RIS 205-*b*, and may also send it to the UE 115-*d*. In some examples, the base station 105-*c* may not accept the one or more spatial resources or the weights and sends an override signal instead.

If the one or more spatial resources and the weights is accepted by the base station 105-*c*, the RIS 205-*b* may apply the set of weights to the reflective elements. That is, the RIS 205-*b* may apply mapped control voltages to the reflective elements to be used for communications with the UE 115-*d*. Once the reflective elements are configured, the UE 115-*d* may send signals at 565 towards the RIS 205-*b*, which may propagate the signal towards the base station 105-*c* as the reflected signal at 570.

Figure 6:
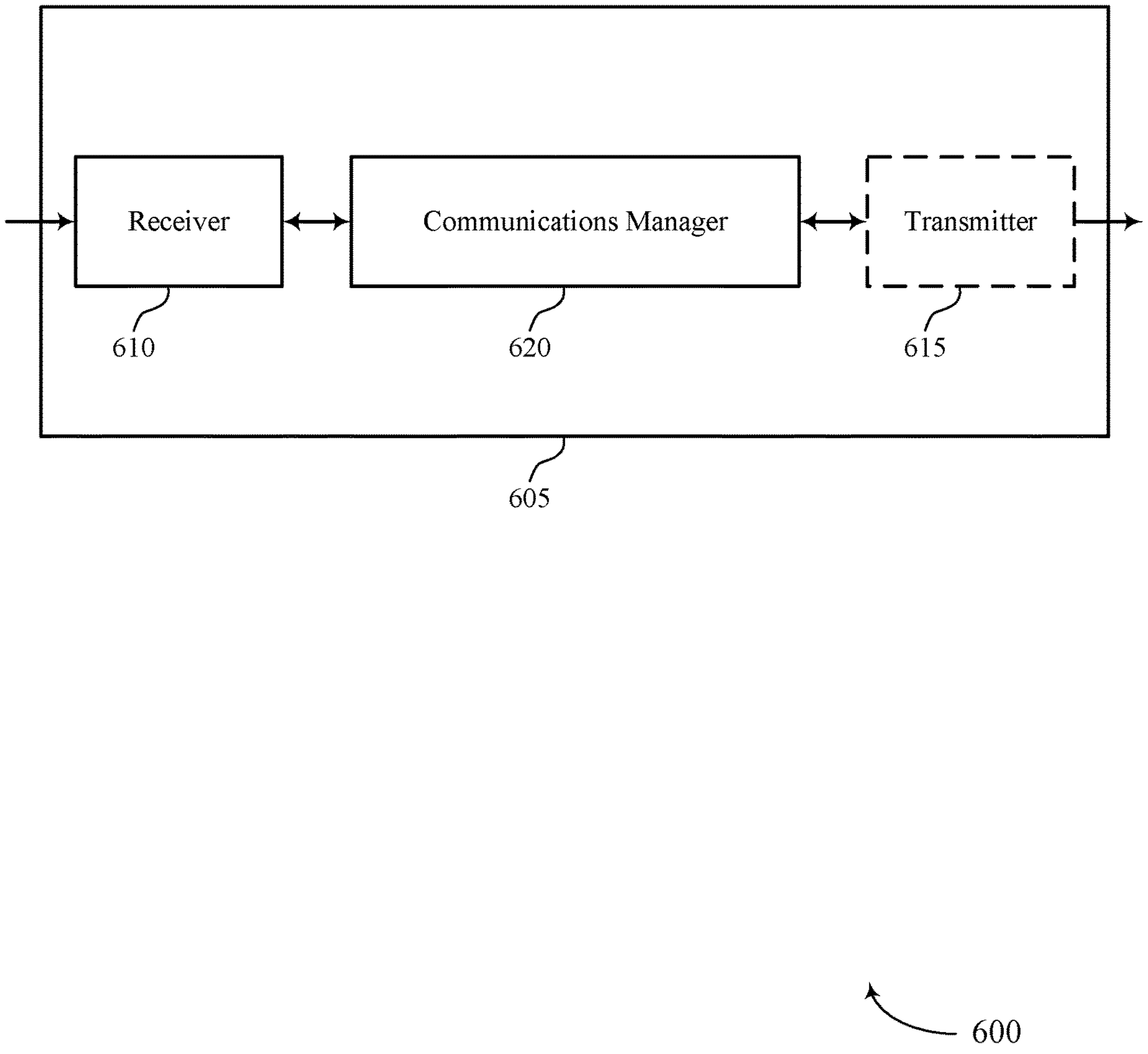
FIGS. 6 and 7 show block diagrams of devices that support active participation of a reflective surface in beam selection in accordance with aspects of the present disclosure.

FIG. 6 shows a block diagram 600 of a device 605 that supports active participation of a reflective surface in beam selection in accordance with aspects of the present disclosure. The device 605 may be an example of aspects of a reconfigurable reflective surface (e.g., an RIS 205) as described herein. The device 605 may include a receiver 610 and a communications manager 620. In some examples, the device 705 may also include a transmitter 615. The device 605 may also include a processor. Each of these components may be in communication with one another (e.g., via one or more buses).

In some cases, the receiver 610 may provide a means for receiving information such as packets, user data, control information, or any combination thereof associated with various information channels (e.g., control channels, data channels, information channels related to active participation of a reflective surface in beam selection). Information may be passed on to other components of the device 605. The receiver 610 may utilize a single antenna or a set of multiple antennas.

In some cases, the transmitter 615 may provide a means for transmitting signals generated by other components of the device 605. For example, the transmitter 615 may transmit information such as packets, user data, control information, or any combination thereof associated with various information channels (e.g., control channels, data channels, information channels related to active participation of a reflective surface in beam selection). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of active participation of a reflective surface in beam selection as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device (PLD), a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a reconfigurable reflective surface in accordance with examples as disclosed herein. For example, the communications manager 620 may be configured as or otherwise support a means for receiving one or more signals from a first wireless device. The communications manager 620 may be configured as or otherwise support a means for determining, based on the one or more signals, measurement information pertaining to a wireless channel between the reconfigurable reflective surface and the first wireless device. The communications manager 620 may be configured as or otherwise support a means for determining, based on the measurement information, a set of weights for a set of multiple reflective elements of the reconfigurable reflective surface to be used in reflecting communications between the first wireless device and a second wireless device.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improved reflecting of signals between two or more wireless devices. These techniques may result in more efficient utilization of communication resources, cheaper deployment of physical structures, reduced information sent over control channels, reducing energy costs, reduced potential interference, and improved wireless coverage areas.

Figure 7:
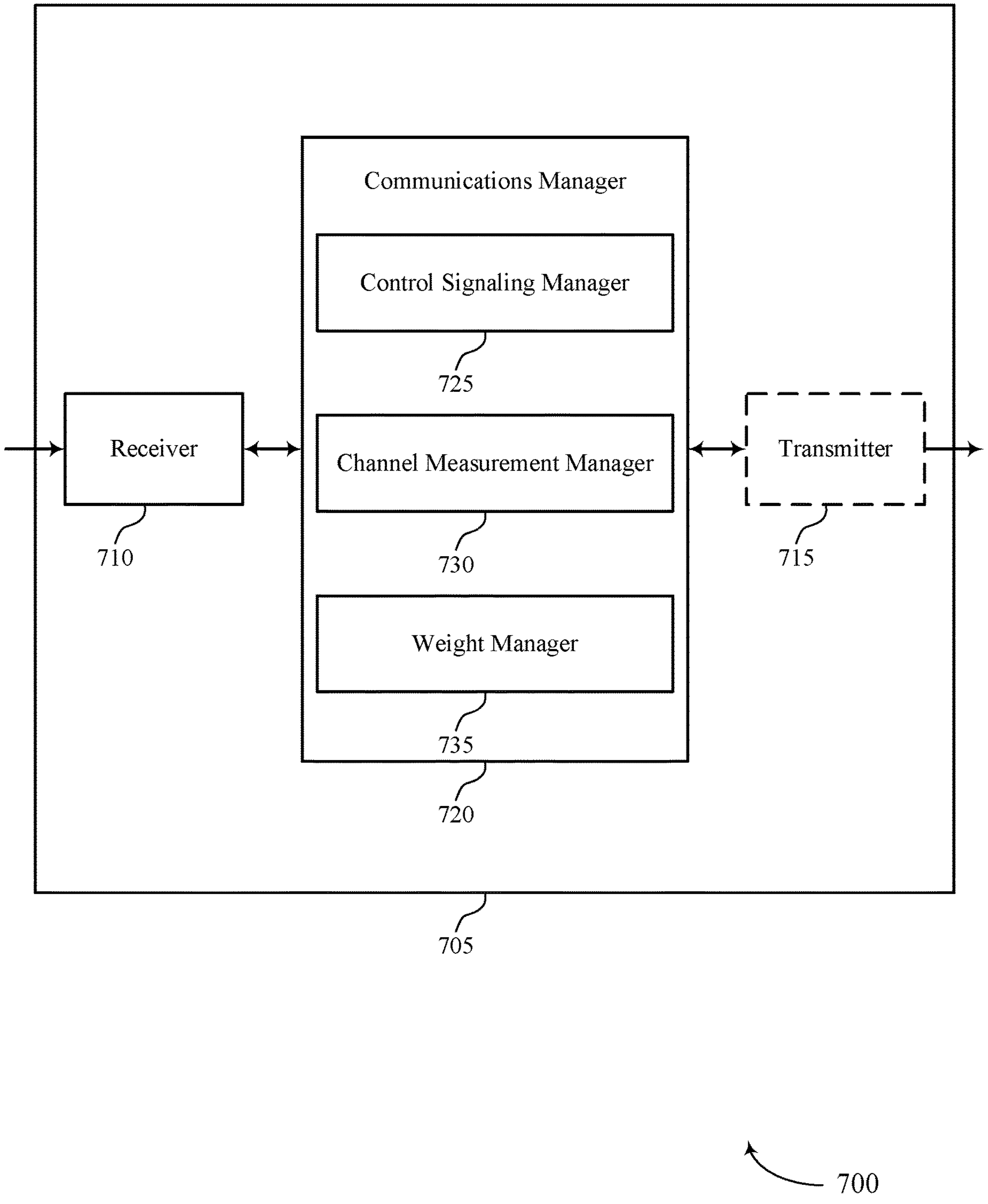

FIG. 7 shows a block diagram 700 of a device 705 that supports active participation of a reflective surface in beam selection in accordance with aspects of the present disclosure. The device 705 may be an example of aspects of a device 605 or a reconfigurable reflective surface 205 as described herein. The device 705 may include a receiver 710 and a communications manager 720. The device 805 may also include a transmitter 715. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to active participation of a reflective surface in beam selection). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to active participation of a reflective surface in beam selection). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of active participation of a reflective surface in beam selection as described herein. For example, the communications manager 720 may include a control signaling manager 725, a channel measurement manager 730, a weight manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a reconfigurable reflective surface in accordance with examples as disclosed herein. The control signaling manager 725 may be configured as or otherwise support a means for receiving one or more signals from a first wireless device. The channel measurement manager 730 may be configured as or otherwise support a means for determining, based on the one or more signals, measurement information pertaining to a wireless channel between the reconfigurable reflective surface and the first wireless device. The weight manager 735 may be configured as or otherwise support a means for determining, based on the measurement information, a set of weights for a set of multiple reflective elements of the reconfigurable reflective surface to be used in reflecting communications between the first wireless device and a second wireless device.

Figure 8:
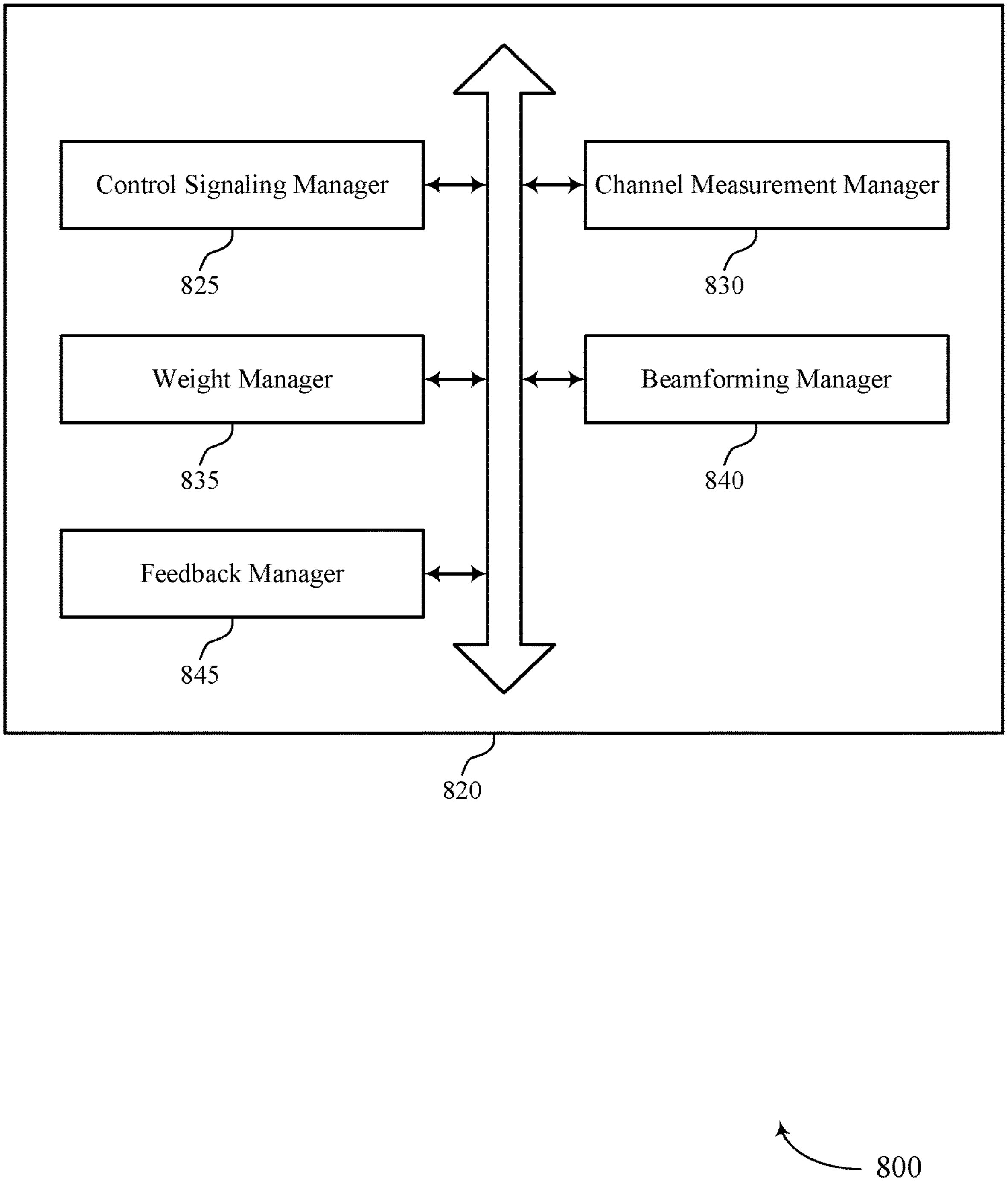
FIG. 8 shows a block diagram of a communications manager that supports active participation of a reflective surface in beam selection in accordance with aspects of the present disclosure.

FIG. 8 shows a block diagram 800 of a communications manager 820 that supports active participation of a reflective surface in beam selection in accordance with aspects of the present disclosure. The communications manager 820 may be an example of aspects of a communications manager 620, a communications manager 720, or both, as described herein. The communications manager 820, or various components thereof, may be an example of means for performing various aspects of active participation of a reflective surface in beam selection as described herein. For example, the communications manager 820 may include a control signaling manager 825, a channel measurement manager 830, a weight manager 835, a beamforming manager 840, a feedback manager 845, or any combination thereof. Each of these components may communicate, directly or indirectly, with one another (e.g., via one or more buses).

The communications manager 820 may support wireless communication at a reconfigurable reflective surface in accordance with examples as disclosed herein. The control signaling manager 825 may be configured as or otherwise support a means for receiving one or more signals from a first wireless device. The channel measurement manager 830 may be configured as or otherwise support a means for determining, based on the one or more signals, measurement information pertaining to a wireless channel between the reconfigurable reflective surface and the first wireless device. The weight manager 835 may be configured as or otherwise support a means for determining, based on the measurement information, a set of weights for a set of multiple reflective elements of the reconfigurable reflective surface to be used in reflecting communications between the first wireless device and a second wireless device.

In some examples, the beamforming manager 840 may be configured as or otherwise support a means for determining, based on the one or more signals, a first spatial resource for the first wireless device to use in communicating with the second wireless device via the reconfigurable reflective surface, and a second spatial resource for the reconfigurable reflective surface to use for the communications that are from the second wireless device to the first wireless device via the reconfigurable reflective surface. In some examples, the feedback manager 845 may be configured as or otherwise support a means for indicating, to at least one of the first wireless device or the second wireless device, a resource identification that is indicative of at least one of the first spatial resource, the second spatial resource, or the set of weights.

In some examples, to support determining the set of weights, the beamforming manager 840 may be configured as or otherwise support a means for determining, based on the one or more signals, a first direction for the first wireless device to use in communicating with the second wireless device via the reconfigurable reflective surface, or a second direction for the reconfigurable reflective surface to use for the communications that are from the second wireless device to the first wireless device via the reconfigurable reflective surface, where the set of weights for the set of multiple reflective elements is based on the first direction and the second direction.

In some examples, the weight manager 835 may be configured as or otherwise support a means for receiving, from the second wireless device, an acceptance indication associated with the set of weights for at least the set of multiple reflective elements. In some examples, the weight manager 835 may be configured as or otherwise support a means for relaying the communications between the first wireless device and the second wireless device using the set of weights.

In some examples, to support receiving the one or more signals from the first wireless device, the control signaling manager 825 may be configured as or otherwise support a means for receiving a measurement report from the first wireless device.

In some examples, to support determining the measurement information pertaining to the wireless channel between the reconfigurable reflective surface and the first wireless device, the channel measurement manager 830 may be configured as or otherwise support a means for determining the measurement information based on information included in the measurement report.

In some examples, the measurement report is based on a multi-shot channel state information reference signal measurement triggered by a downlink control information from the second wireless device, the measurement report including reference signal received power measurements for respective shots of a channel state information reference signal.

In some examples, to support receiving the one or more signals from the first wireless device, the control signaling manager 825 may be configured as or otherwise support a means for receiving the measurement report via an uplink control channel message or an uplink shared channel message from the first wireless device on time domain and frequency domain resources previously provided to the reconfigurable reflective surface.

In some examples, to support receiving the one or more signals from the first wireless device, the control signaling manager 825 may be configured as or otherwise support a means for receiving the measurement report via a dedicated control channel between the first wireless device and the reconfigurable reflective surface.

In some examples, the control signaling manager 825 may be configured as or otherwise support a means for monitoring a set of multiple dedicated control channels that are each between respective first wireless devices and the reconfigurable reflective surface, the dedicated control channel between the first wireless device and the reconfigurable reflective surface being one of the set of multiple dedicated control channels.

In some examples, the measurement report includes an identification of the first wireless device.

In some examples, to support receiving the one or more signals from the first wireless device, the control signaling manager 825 may be configured as or otherwise support a means for receiving the one or more signals as one or more sounding reference signals on a set of uplink transmission resources reserved for supporting the reconfigurable reflective surface in deriving the set of weights.

In some examples, to support determining the measurement information pertaining to the wireless channel between the reconfigurable reflective surface and the first wireless device, the channel measurement manager 830 may be configured as or otherwise support a means for measuring the one or more sounding reference signals. In some examples, to support determining the measurement information pertaining to the wireless channel between the reconfigurable reflective surface and the first wireless device, the channel measurement manager 830 may be configured as or otherwise support a means for deriving the measurement information from the measuring.

In some examples, each of the one or more sounding reference signals corresponds to a transmit beam from the first wireless device.

In some examples, the control signaling manager 825 may be configured as or otherwise support a means for receiving, from the second wireless device, an override indication associated with the set of weights for at least the set of multiple reflective elements. In some examples, the weight manager 835 may be configured as or otherwise support a means for updating the set of weights for at least the set of multiple reflective elements of the reconfigurable reflective surface based on the override indication.

In some examples, the control signaling manager 825 may be configured as or otherwise support a means for receiving one or more additional signals from the second wireless device, where updating the set of weights is further based on the one or more additional signals.

In some examples, the set of weights for at least the set of multiple reflective elements include weights. In some examples, each weight of the set of weights maps a control voltage for a reflective element of the set of multiple reflective elements.

Figure 9:
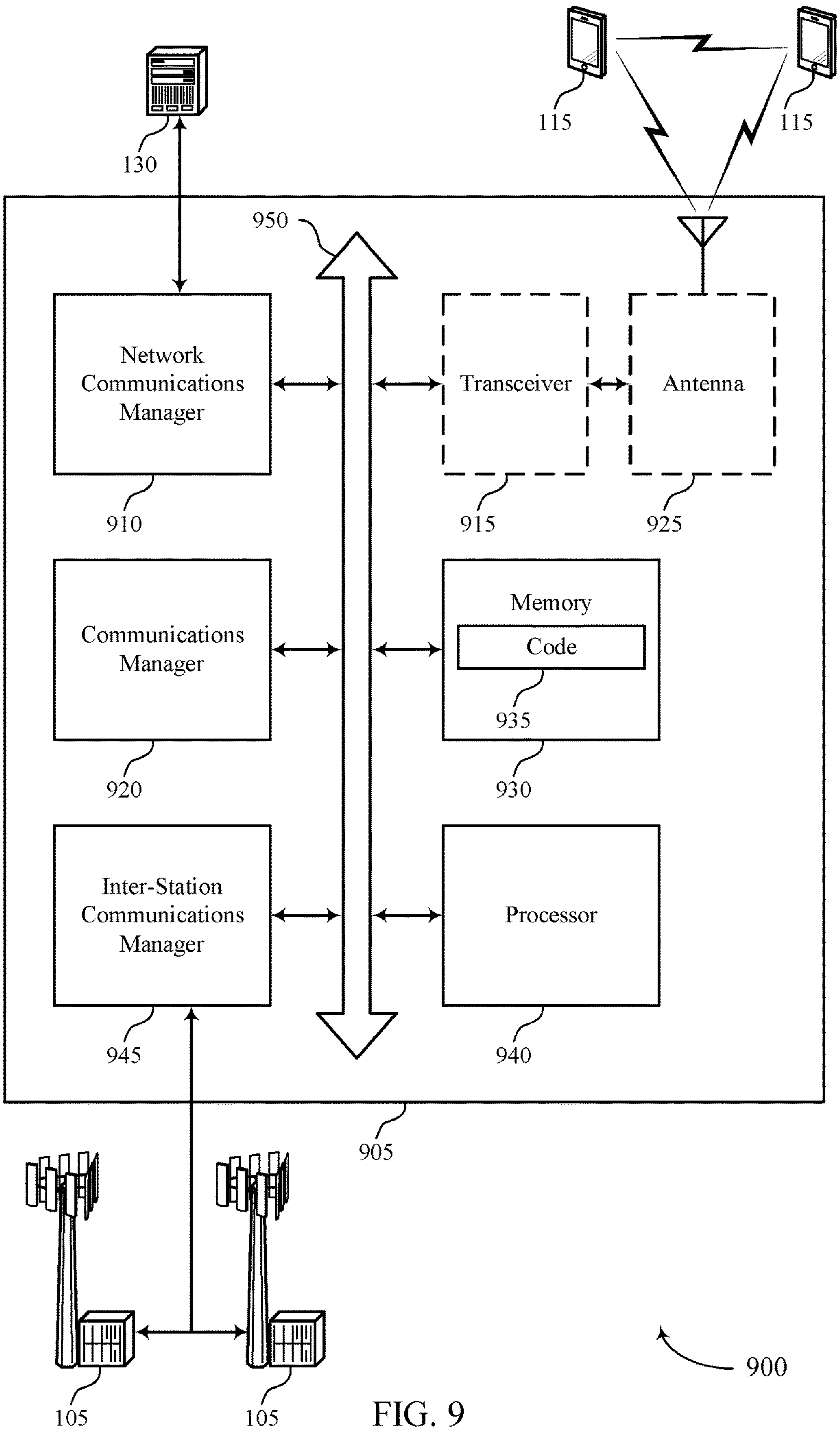
FIG. 9 shows a diagram of a system including a device that supports active participation of a reflective surface in beam selection in accordance with aspects of the present disclosure.

FIG. 9 shows a diagram of a system 900 including a device 905 that supports active participation of a reflective surface in beam selection in accordance with aspects of the present disclosure. The device 905 may be an example of or include the components of a device 605, a device 705, or a reconfigurable reflective surface as described herein. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting active participation of a reflective surface in beam selection). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communication at a reconfigurable reflective surface in accordance with examples as disclosed herein. For example, the communications manager 920 may be configured as or otherwise support a means for receiving one or more signals from a first wireless device. The communications manager 920 may be configured as or otherwise support a means for determining, based on the one or more signals, measurement information pertaining to a wireless channel between the reconfigurable reflective surface and the first wireless device. The communications manager 920 may be configured as or otherwise support a means for determining, based on the measurement information, a set of weights for a set of multiple reflective elements of the reconfigurable reflective surface to be used in reflecting communications between the first wireless device and a second wireless device.

By including or configuring the communications manager 920 in accordance with examples as described herein, the device 905 may support techniques for improved communication reliability, reduced latency, improved user experience related to reduced interference, reduced power consumption, more efficient utilization of communication resources, improved coordination between devices, and longer battery life.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of active participation of a reflective surface in beam selection as described herein, or the processor 940 and the memory 930 may be otherwise configured to perform or support such operations.

Figure 10:
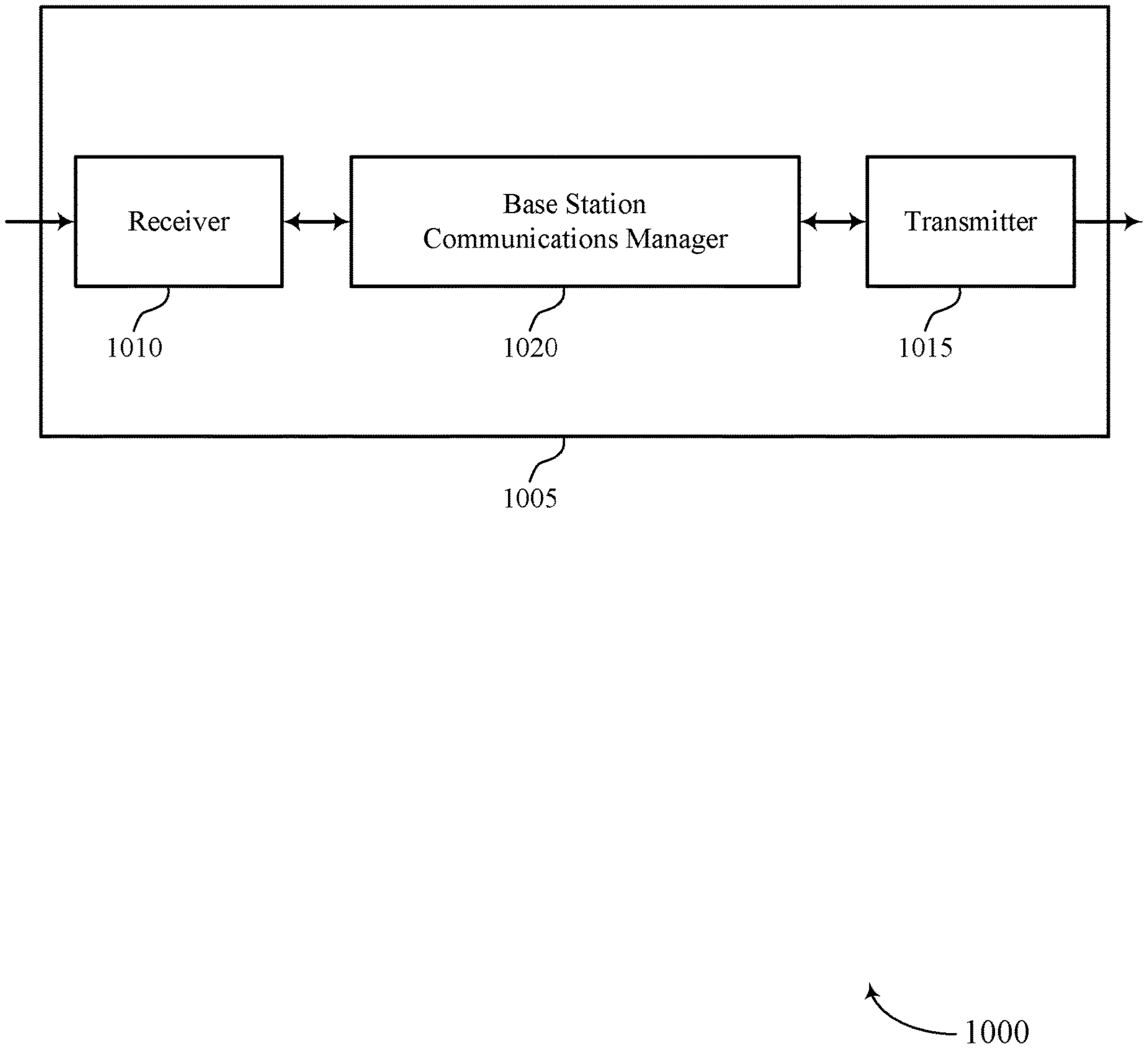
FIGS. 10 and 11 show block diagrams of devices that support active participation of a reflective surface in beam selection in accordance with aspects of the present disclosure.

FIG. 10 shows a block diagram 1000 of a device 1005 that supports active participation of a reflective surface in beam selection in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to active participation of a reflective surface in beam selection). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to active participation of a reflective surface in beam selection). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of active participation of a reflective surface in beam selection as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first wireless device in accordance with examples as disclosed herein. For example, the communications manager 1020 may be configured as or otherwise support a means for transmitting, to a reconfigurable reflective surface, an indication of resources for monitoring for one or more signals from a second wireless device, where the one or more signals relates to measurement information pertaining to a wireless channel between the second wireless device and the reconfigurable reflective surface. The communications manager 1020 may be configured as or otherwise support a means for receiving a resource identification that is indicative of a set of weights for a set of multiple reflective elements of the reconfigurable reflective surface based on the one or more signals.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced interference, reduced power consumption, and more efficient utilization of communication resources.

Figure 11:
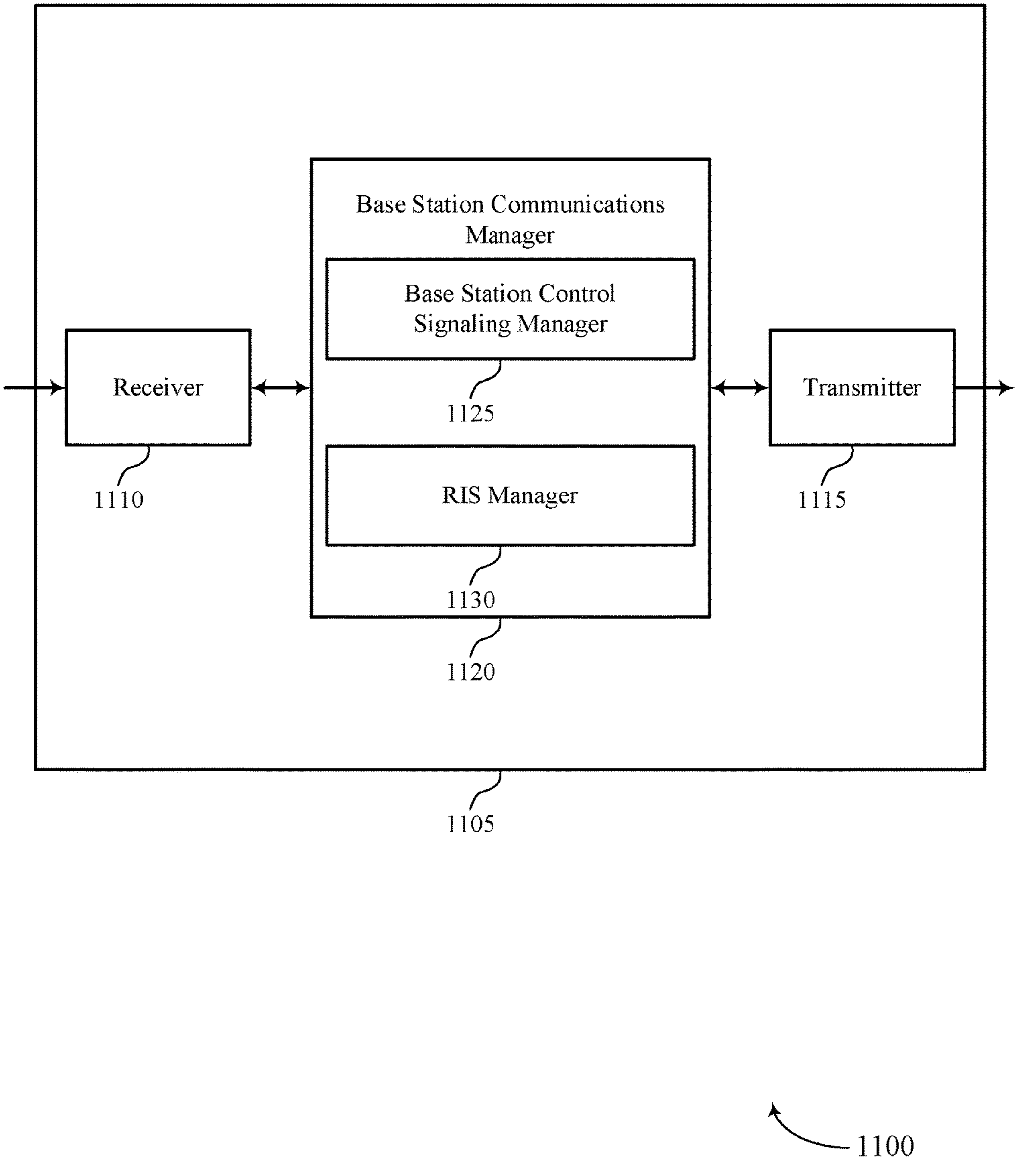

FIG. 11 shows a block diagram 1100 of a device 1105 that supports active participation of a reflective surface in beam selection in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to active participation of a reflective surface in beam selection). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to active participation of a reflective surface in beam selection). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of active participation of a reflective surface in beam selection as described herein. For example, the communications manager 1120 may include a base station control signaling manager 1125 a RIS manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first wireless device in accordance with examples as disclosed herein. The base station control signaling manager 1125 may be configured as or otherwise support a means for transmitting, to a reconfigurable reflective surface, an indication of resources for monitoring for one or more signals from a second wireless device, where the one or more signals relates to measurement information pertaining to a wireless channel between the second wireless device and the reconfigurable reflective surface. The RIS manager 1130 may be configured as or otherwise support a means for receiving a resource identification that is indicative of a set of weights for a set of multiple reflective elements of the reconfigurable reflective surface based on the one or more signals.

Figure 12:
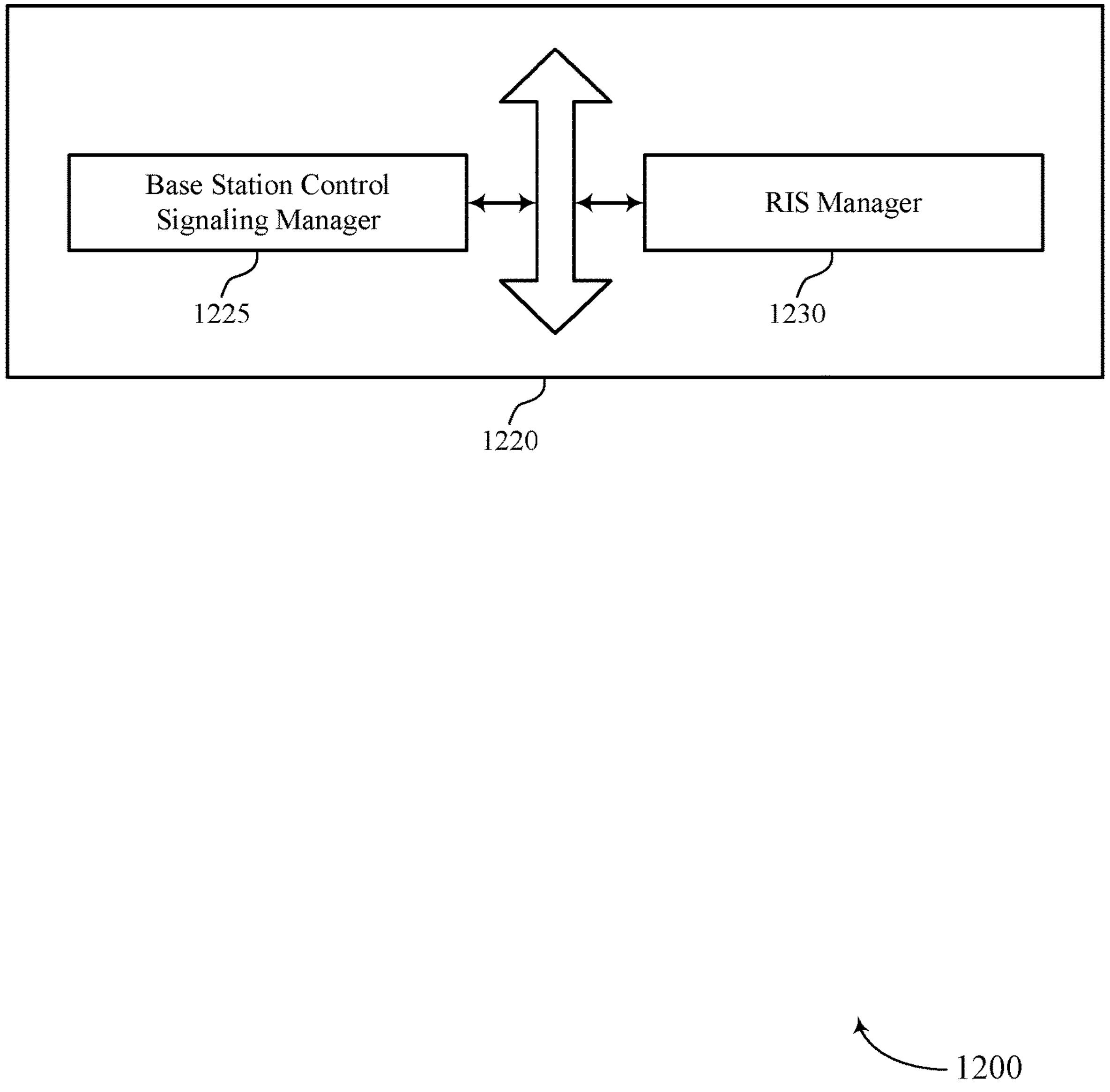
FIG. 12 shows a block diagram of a communications manager that supports active participation of a reflective surface in beam selection in accordance with aspects of the present disclosure.

FIG. 12 shows a block diagram 1200 of a communications manager 1220 that supports active participation of a reflective surface in beam selection in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of active participation of a reflective surface in beam selection as described herein. For example, the communications manager 1220 may include a base station control signaling manager 1225 a RIS manager 1230, or any combination thereof. Each of these components may communicate, directly or indirectly, with one another (e.g., via one or more buses).

The communications manager 1220 may support wireless communication at a first wireless device in accordance with examples as disclosed herein. The base station control signaling manager 1225 may be configured as or otherwise support a means for transmitting, to a reconfigurable reflective surface, an indication of resources for monitoring for one or more signals from a second wireless device, where the one or more signals relates to measurement information pertaining to a wireless channel between the second wireless device and the reconfigurable reflective surface. The RIS manager 1230 may be configured as or otherwise support a means for receiving a resource identification that is indicative of a set of weights for a set of multiple reflective elements of the reconfigurable reflective surface based on the one or more signals.

In some examples, the resource identification further indicates at least one of a first spatial resource for the first wireless device to use in communicating with the second wireless device via the reconfigurable reflective surface or a second spatial resource for the reconfigurable reflective surface to use for communications that are from the second wireless device to the first wireless device via the reconfigurable reflective surface.

In some examples, the wireless channel is a first wireless channel, and the base station control signaling manager 1225 may be configured as or otherwise support a means for transmitting, to the reconfigurable reflective surface, one or more additional signals indicating information related to a second wireless channel between the first wireless device or a third wireless device and the reconfigurable reflective surface.

In some examples, the RIS manager 1230 may be configured as or otherwise support a means for transmitting, to the reconfigurable reflective surface, an override indication associated with the resource identification.

In some examples, the base station control signaling manager 1225 may be configured as or otherwise support a means for transmitting downlink control information to the second wireless device to trigger one or more channel state information reference signal measurements at the second wireless device, where the one or more signals is based on the one or more channel state information reference signal measurements.

Figure 13:
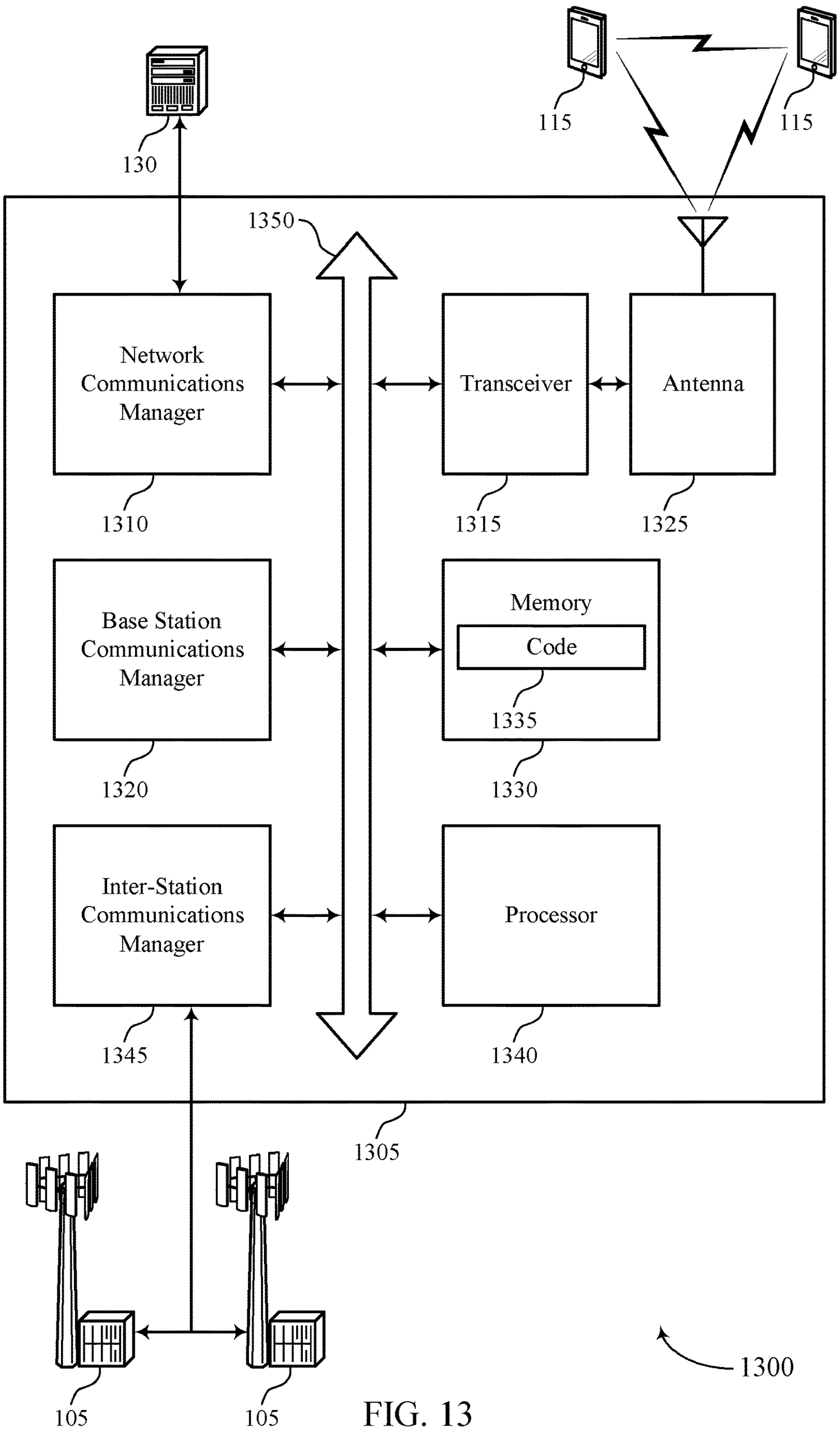
FIG. 13 shows a diagram of a system including a device that supports active participation of a reflective surface in beam selection in accordance with aspects of the present disclosure.

FIG. 13 shows a diagram of a system 1300 including a device 1305 that supports active participation of a reflective surface in beam selection in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting active participation of a reflective surface in beam selection). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a first wireless device in accordance with examples as disclosed herein. For example, the communications manager 1320 may be configured as or otherwise support a means for transmitting, to a reconfigurable reflective surface, an indication of resources for monitoring for one or more signals from a second wireless device, where the one or more signals relates to measurement information pertaining to a wireless channel between the second wireless device and the reconfigurable reflective surface. The communications manager 1320 may be configured as or otherwise support a means for receiving a resource identification that is indicative of a set of weights for a set of multiple reflective elements of the reconfigurable reflective surface based on the one or more signals.

By including or configuring the communications manager 1320 in accordance with examples as described herein, the device 1305 may support techniques for improved communication reliability, improved user experience related to reduced processing and interference, reduced power consumption, and more efficient utilization of communication resources, and longer battery life.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of active participation of a reflective surface in beam selection as described herein, or the processor 1340 and the memory 1330 may be otherwise configured to perform or support such operations.

Figure 14:
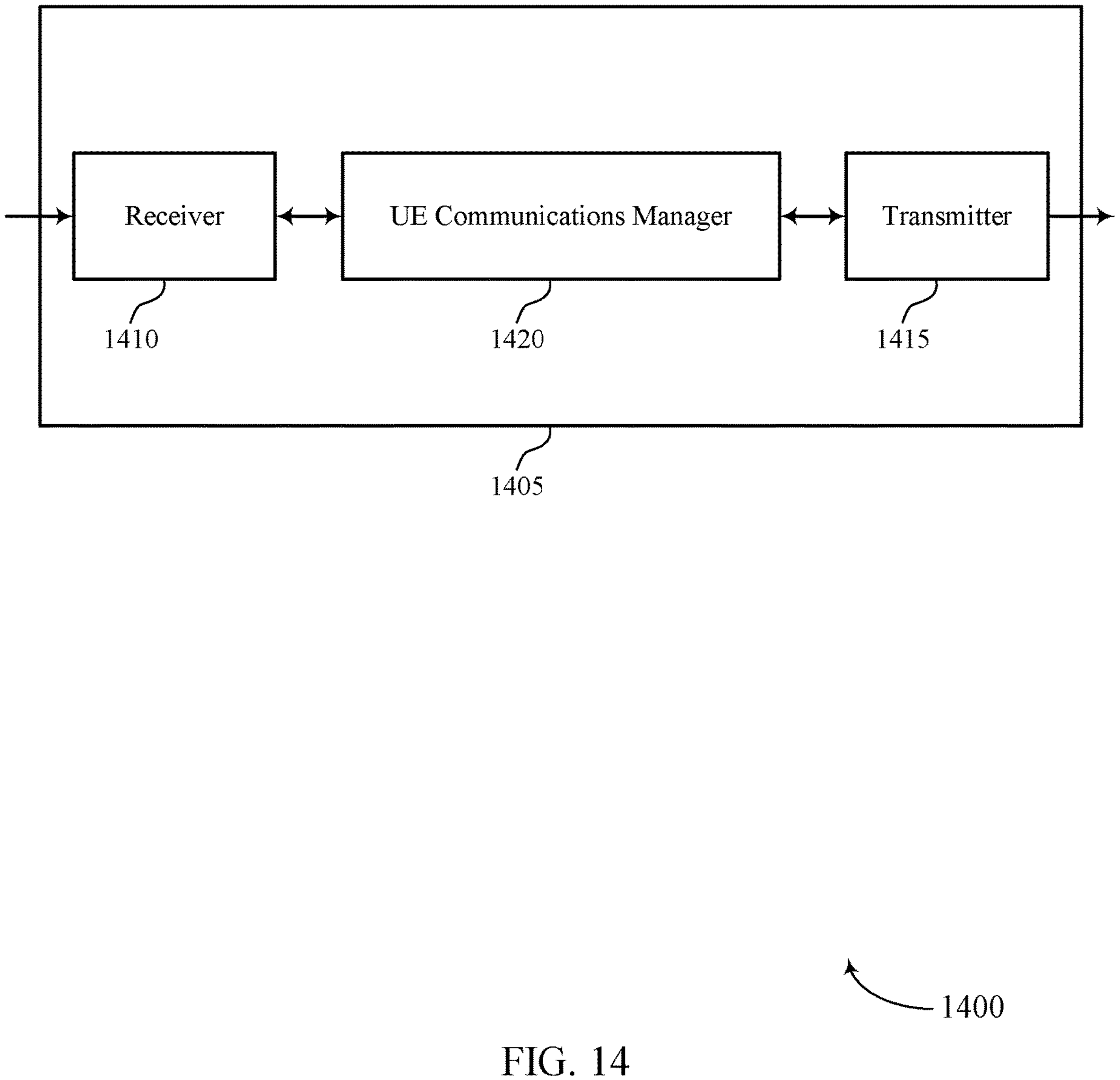
FIGS. 14 and 15 show block diagrams of devices that support active participation of a reflective surface in beam selection in accordance with aspects of the present disclosure.

FIG. 14 shows a block diagram 1400 of a device 1405 that supports active participation of a reflective surface in beam selection in accordance with aspects of the present disclosure. The device 1405 may be an example of aspects of a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to active participation of a reflective surface in beam selection). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to active participation of a reflective surface in beam selection). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of active participation of a reflective surface in beam selection as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, a FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a first wireless device in accordance with examples as disclosed herein. For example, the communications manager 1420 may be configured as or otherwise support a means for receiving, from a second wireless device, an indication of one or more resources for transmitting one or more signals, where the one or more signals relate to a wireless channel between the first wireless device and a reconfigurable reflective surface. The communications manager 1420 may be configured as or otherwise support a means for transmitting, to the reconfigurable reflective surface, the one or more signals using the one or more resources.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for reduced processing, reduced power consumption, and more efficient utilization of communication resources.

Figure 15:
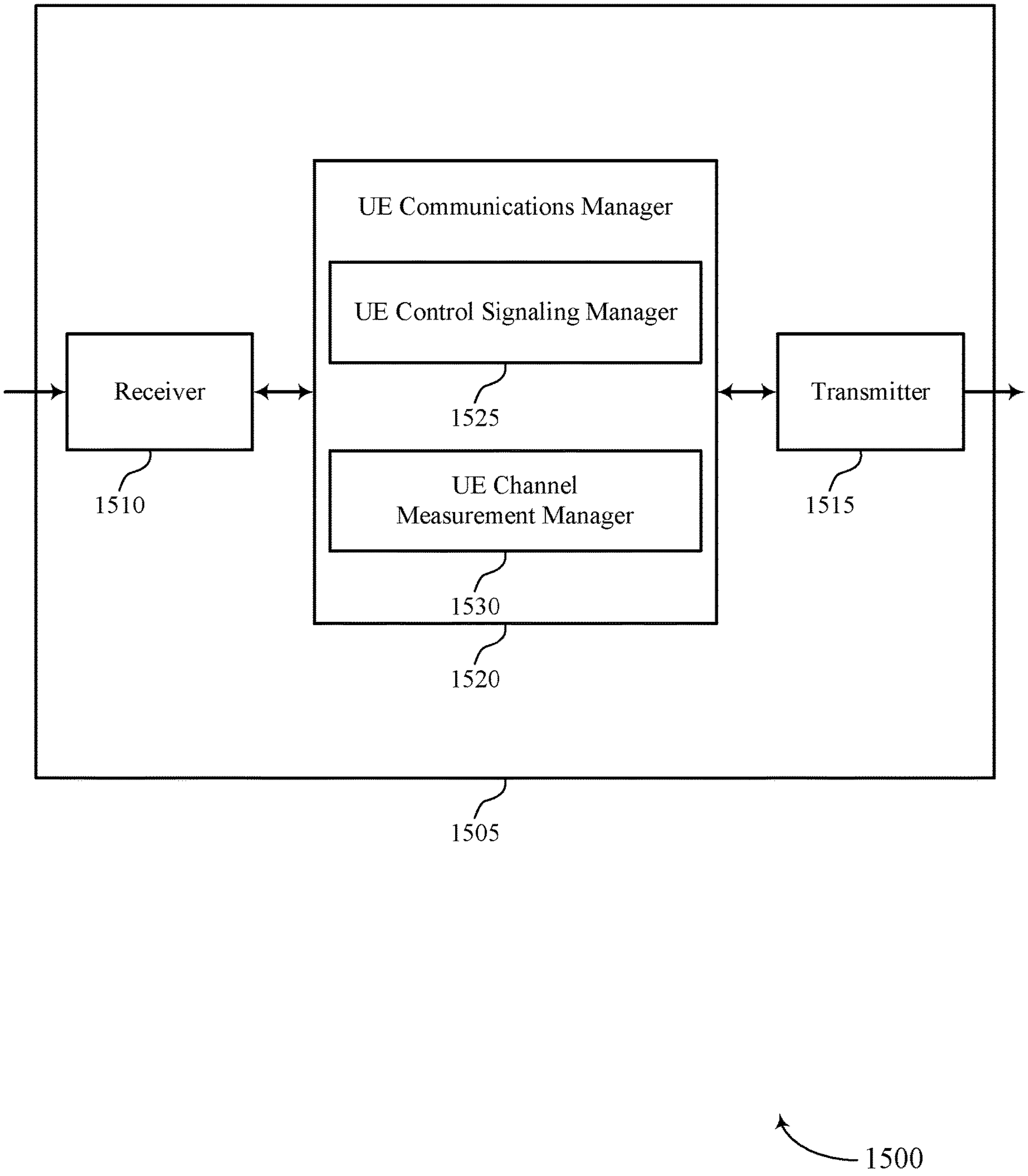

FIG. 15 shows a block diagram 1500 of a device 1505 that supports active participation of a reflective surface in beam selection in accordance with aspects of the present disclosure. The device 1505 may be an example of aspects of a device 1405 or a UE 115 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to active participation of a reflective surface in beam selection). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to active participation of a reflective surface in beam selection). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of active participation of a reflective surface in beam selection as described herein. For example, the communications manager 1520 may include a UE control signaling manager 1525 a UE channel measurement manager 1530, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a first wireless device in accordance with examples as disclosed herein. The UE control signaling manager 1525 may be configured as or otherwise support a means for receiving, from a second wireless device, an indication of one or more resources for transmitting one or more signals, where the one or more signals relate to a wireless channel between the first wireless device and a reconfigurable reflective surface. The UE channel measurement manager 1530 may be configured as or otherwise support a means for transmitting, to the reconfigurable reflective surface, the one or more signals using the one or more resources.

Figure 16:
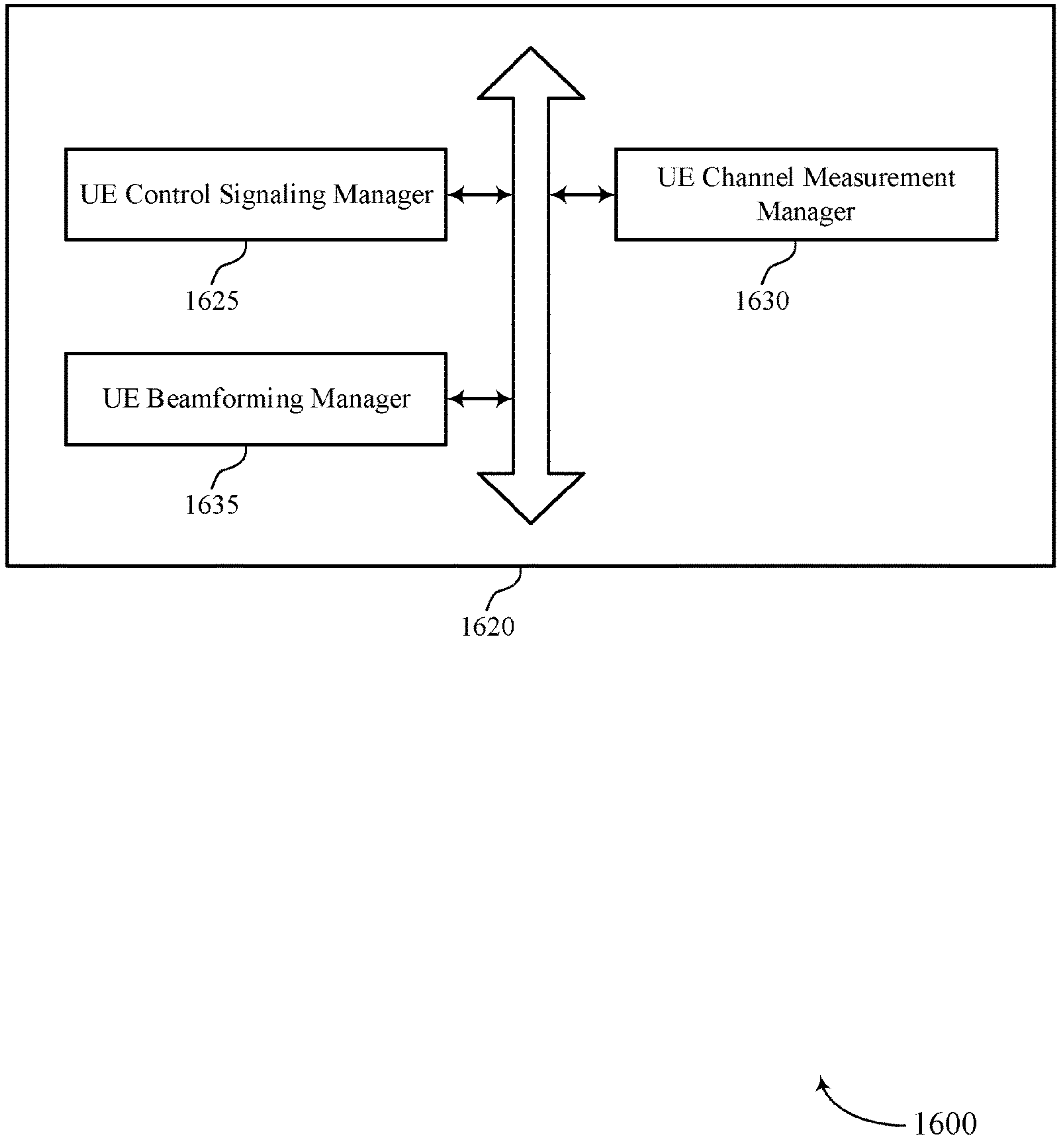
FIG. 16 shows a block diagram of a communications manager that supports active participation of a reflective surface in beam selection in accordance with aspects of the present disclosure.

FIG. 16 shows a block diagram 1600 of a communications manager 1620 that supports active participation of a reflective surface in beam selection in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of active participation of a reflective surface in beam selection as described herein. For example, the communications manager 1620 may include a UE control signaling manager 1625, a UE channel measurement manager 1630, a UE beamforming manager 1635, or any combination thereof. Each of these components may communicate, directly or indirectly, with one another (e.g., via one or more buses).

The communications manager 1620 may support wireless communication at a first wireless device in accordance with examples as disclosed herein. The UE control signaling manager 1625 may be configured as or otherwise support a means for receiving, from a second wireless device, an indication of one or more resources for transmitting one or more signals, where the one or more signals relate to a wireless channel between the first wireless device and a reconfigurable reflective surface. The UE channel measurement manager 1630 may be configured as or otherwise support a means for transmitting, to the reconfigurable reflective surface, the one or more signals using the one or more resources.

In some examples, to support transmitting the one or more signals, the UE channel measurement manager 1630 may be configured as or otherwise support a means for transmitting a measurement report to the reconfigurable reflective surface.

In some examples, the UE channel measurement manager 1630 may be configured as or otherwise support a means for measuring the wireless channel using a multi-shot channel state information reference signal measurement triggered by a downlink control information from the second wireless device, the measurement report including reference signal received power measurements for respective shots of a channel state information reference signal.

In some examples, the UE channel measurement manager 1630 may be configured as or otherwise support a means for measuring the wireless channel using a sounding reference signal.

In some examples, the UE beamforming manager 1635 may be configured as or otherwise support a means for receiving a resource identification from the reconfigurable reflective surface, where transmitting the one or more signals is based on the resource identification.

Figure 17:
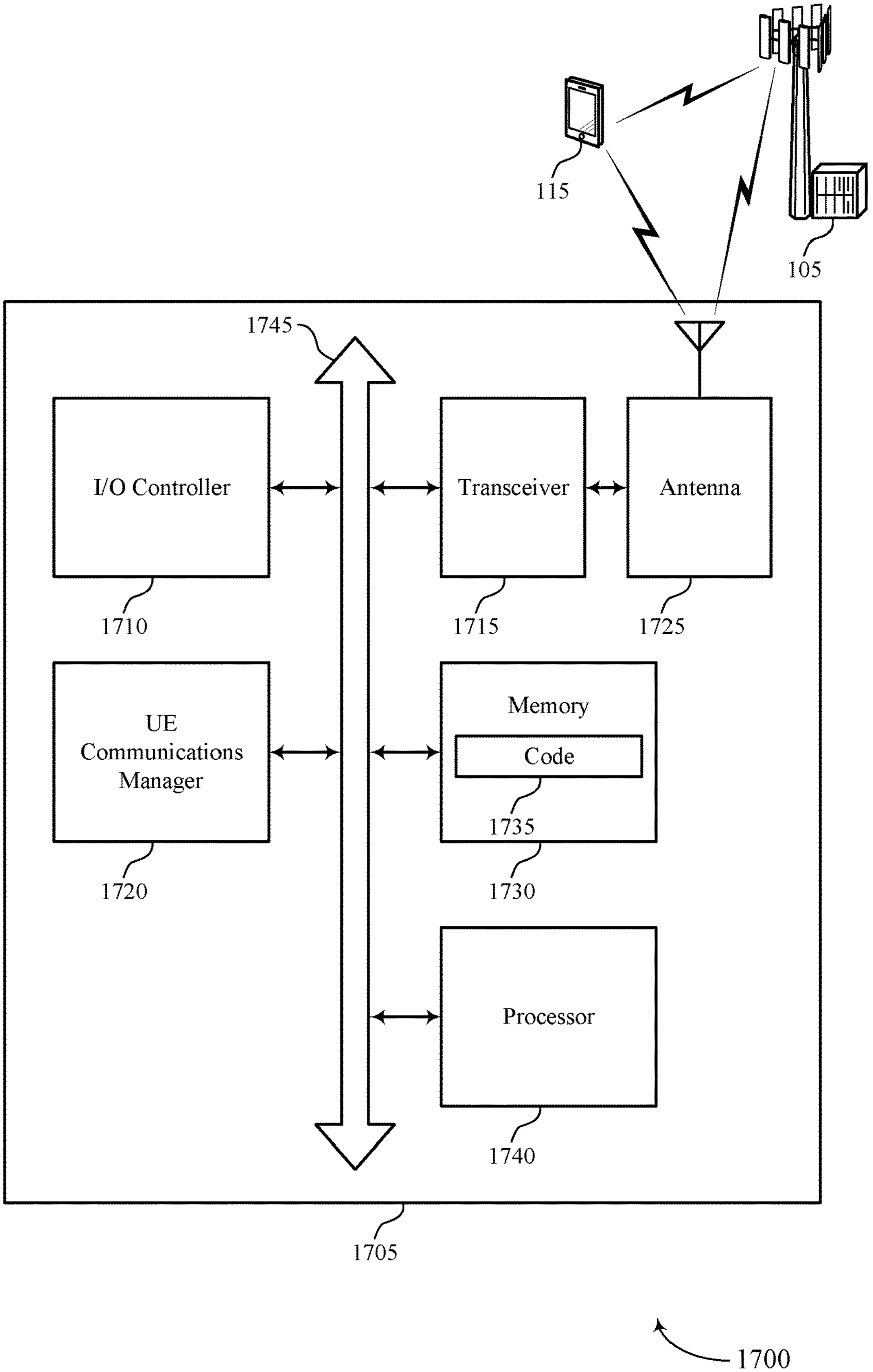
FIG. 17 shows a diagram of a system including a device that supports active participation of a reflective surface in beam selection in accordance with aspects of the present disclosure.

FIG. 17 shows a diagram of a system 1700 including a device 1705 that supports active participation of a reflective surface in beam selection in accordance with aspects of the present disclosure. The device 1705 may be an example of or include the components of a device 1405, a device 1505, or a UE 115 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, an input/output (I/O) controller 1710, a transceiver 1715, an antenna 1725, a memory 1730, code 1735, and a processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705. In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally, or alternatively, the I/O controller 1710 may represent or interact with a modem, a keyboard, a mouse, a touchscreen, or a similar device. In some cases, the I/O controller 1710 may be implemented as part of a processor, such as the processor 1740. In some cases, a user may interact with the device 1705 via the I/O controller 1710 or via hardware components controlled by the I/O controller 1710.

In some cases, the device 1705 may include a single antenna 1725. However, in some other cases, the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include random access memory (RAM) and read-only memory (ROM). The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a basic I/O system (BIOS) which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting active participation of a reflective surface in beam selection). For example, the device 1705 or a component of the device 1705 may include a processor 1740 and memory 1730 coupled to the processor 1740, the processor 1740 and memory 1730 configured to perform various functions described herein.

The communications manager 1720 may support wireless communication at a first wireless device in accordance with examples as disclosed herein. For example, the communications manager 1720 may be configured as or otherwise support a means for receiving, from a second wireless device, an indication of one or more resources for transmitting one or more signals, where the one or more signals relate to a wireless channel between the first wireless device and a reconfigurable reflective surface. The communications manager 1720 may be configured as or otherwise support a means for transmitting, to the reconfigurable reflective surface, the one or more signals using the one or more resources.

By including or configuring the communications manager 1720 in accordance with examples as described herein, the device 1705 may support techniques for improved communication reliability, reduced latency, improved user experience related to reduced processing and interference, reduced power consumption, and longer battery life.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of active participation of a reflective surface in beam selection as described herein, or the processor 1740 and the memory 1730 may be otherwise configured to perform or support such operations.

Figure 18:
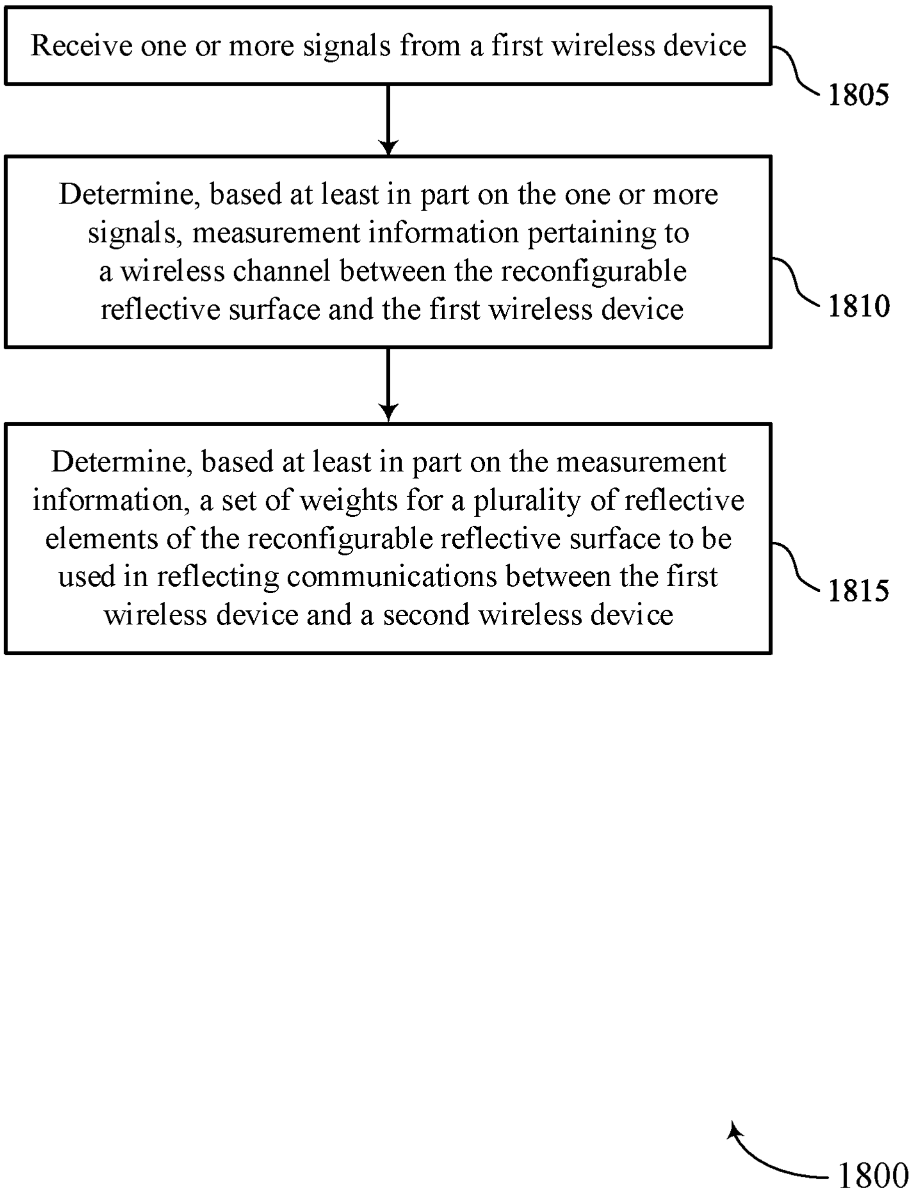
FIGS. 18 through 21 show flowcharts illustrating methods that support active participation of a reflective surface in beam selection in accordance with aspects of the present disclosure.

FIG. 18 shows a flowchart illustrating a method 1800 that supports active participation of a reflective surface in beam selection in accordance with aspects of the present disclosure. The operations of the method 1800 may be implemented by a reconfigurable reflective surface or its components as described herein. For example, the operations of the method 1800 may be performed by a reconfigurable reflective surface as described with reference to FIGS. 1 through 9. In some examples, a reconfigurable reflective surface may execute a set of instructions to control the functional elements of the reconfigurable reflective surface to perform the described functions. Additionally, or alternatively, the reconfigurable reflective surface may perform aspects of the described functions using special-purpose hardware.

At 1805, the method may include receiving one or more signals from a first wireless device. The operations of 1805 may be performed in accordance with examples as disclosed herein. In some examples, aspects of the operations of 1805 may be performed by a control signaling manager 825 as described with reference to FIG. 8.

At 1810, the method may include determining, based on the one or more signals, measurement information pertaining to a wireless channel between the reconfigurable reflective surface and the first wireless device. The operations of 1810 may be performed in accordance with examples as disclosed herein. In some examples, aspects of the operations of 1810 may be performed by a channel measurement manager 830 as described with reference to FIG. 8.

At 1815, the method may include determining, based on the measurement information, a set of weights for a set of multiple reflective elements of the reconfigurable reflective surface to be used in reflecting communications between the first wireless device and a second wireless device. The operations of 1815 may be performed in accordance with examples as disclosed herein. In some examples, aspects of the operations of 1815 may be performed by a weight manager 835 as described with reference to FIG. 8.

Figure 19:
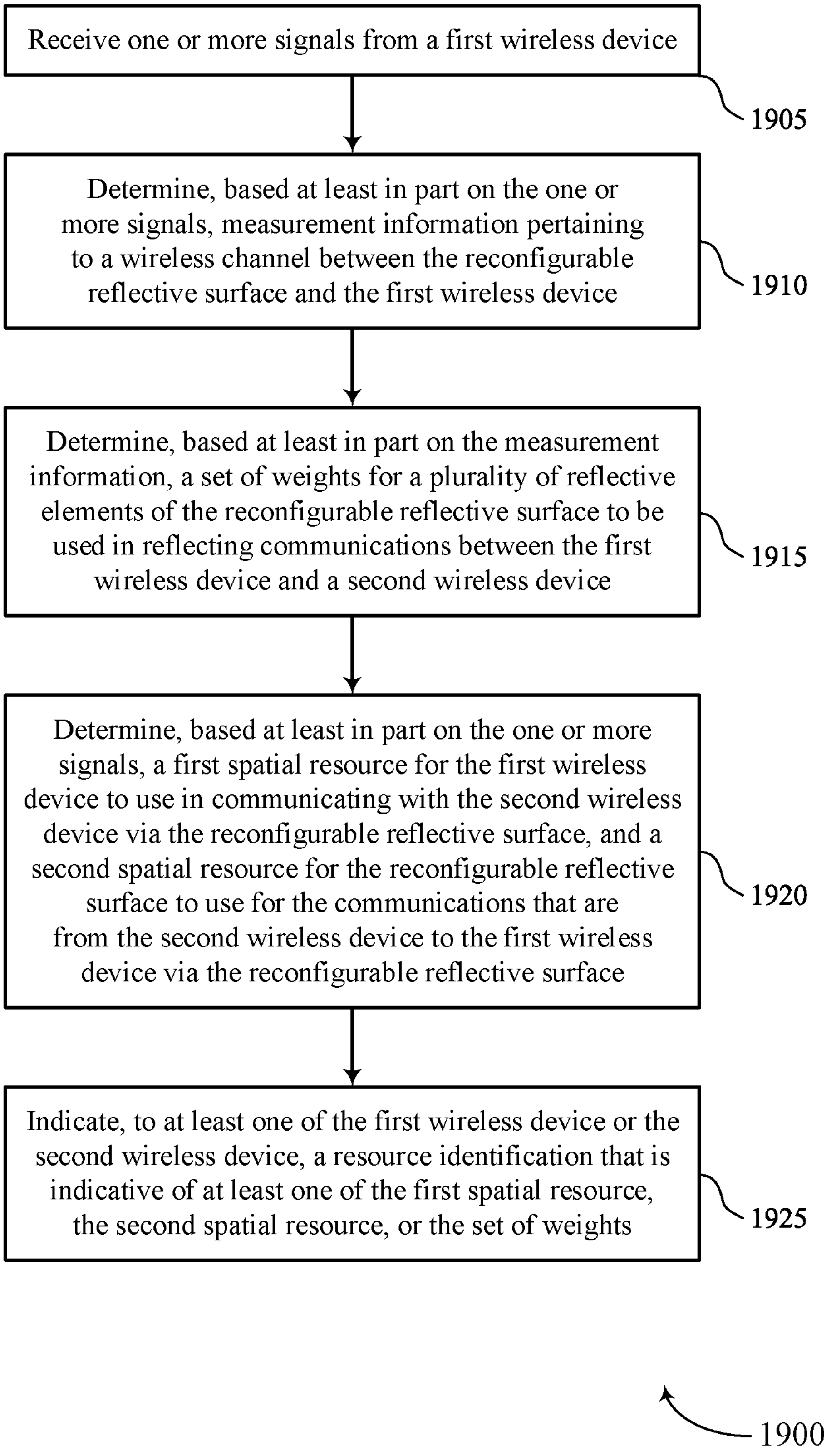

FIG. 19 shows a flowchart illustrating a method 1900 that supports active participation of a reflective surface in beam selection in accordance with aspects of the present disclosure. The operations of the method 1900 may be implemented by a reconfigurable reflective surface or its components as described herein. For example, the operations of the method 1900 may be performed by a reconfigurable reflective surface as described with reference to FIGS. 1 through 9. In some examples, a reconfigurable reflective surface may execute a set of instructions to control the functional elements of the reconfigurable reflective surface to perform the described functions. Additionally, or alternatively, the reconfigurable reflective surface may perform aspects of the described functions using special-purpose hardware.

At 1905, the method may include receiving one or more signals from a first wireless device. The operations of 1905 may be performed in accordance with examples as disclosed herein. In some examples, aspects of the operations of 1905 may be performed by a control signaling manager 825 as described with reference to FIG. 8.

At 1910, the method may include determining, based on the one or more signals, measurement information pertaining to a wireless channel between the reconfigurable reflective surface and the first wireless device. The operations of 1910 may be performed in accordance with examples as disclosed herein. In some examples, aspects of the operations of 1910 may be performed by a channel measurement manager 830 as described with reference to FIG. 8.

At 1915, the method may include determining, based on the measurement information, a set of weights for a set of multiple reflective elements of the reconfigurable reflective surface to be used in reflecting communications between the first wireless device and a second wireless device. The operations of 1915 may be performed in accordance with examples as disclosed herein. In some examples, aspects of the operations of 1915 may be performed by a weight manager 835 as described with reference to FIG. 8.

At 1920, the method may include determining, based on the one or more signals, a first spatial resource for the first wireless device to use in communicating with the second wireless device via the reconfigurable reflective surface, and a second spatial resource for the reconfigurable reflective surface to use for the communications that are from the second wireless device to the first wireless device via the reconfigurable reflective surface. The operations of 1920 may be performed in accordance with examples as disclosed herein. In some examples, aspects of the operations of 1920 may be performed by a beamforming manager 840 as described with reference to FIG. 8.

At 1925, the method may include indicating, to at least one of the first wireless device or the second wireless device, a resource identification that is indicative of at least one of the first spatial resource, the second spatial resource, or the set of weights. The operations of 1925 may be performed in accordance with examples as disclosed herein. In some examples, aspects of the operations of 1925 may be performed by a feedback manager 845 as described with reference to FIG. 8.

Figure 20:
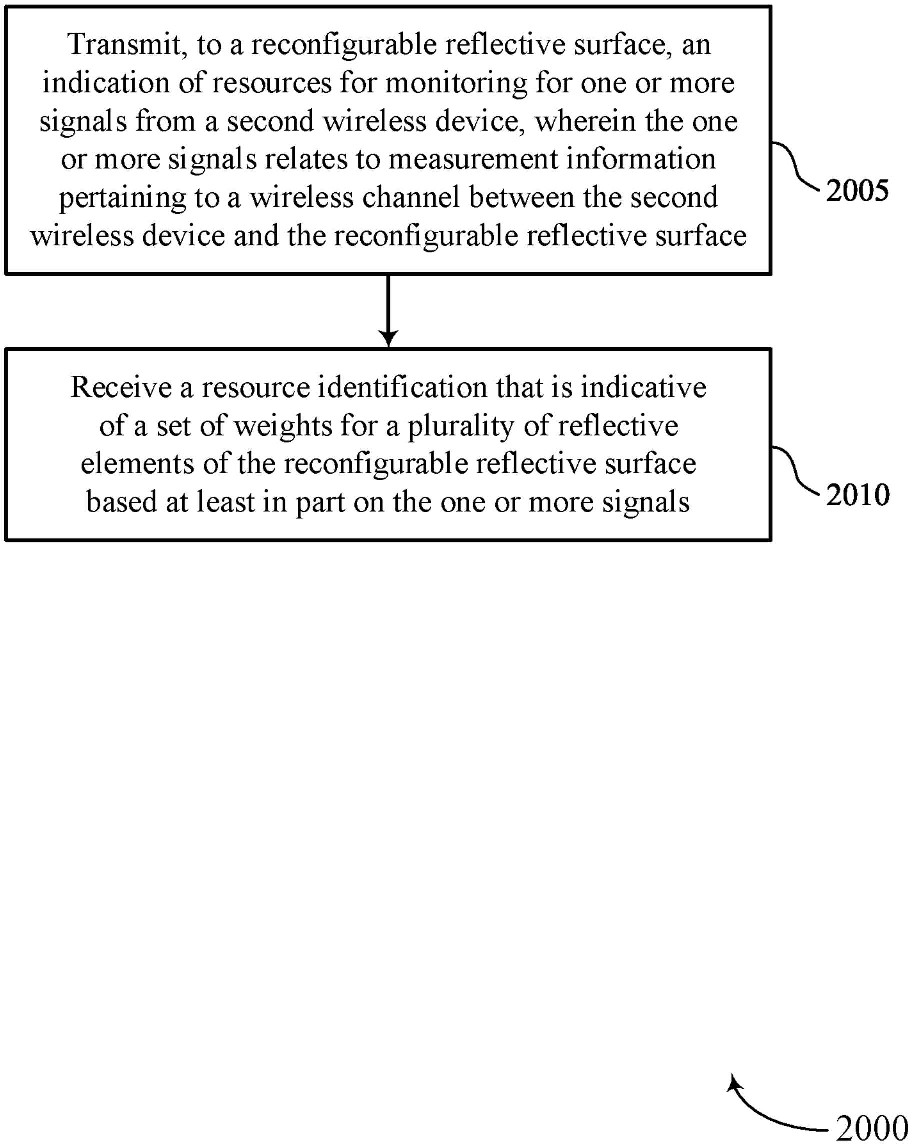

FIG. 20 shows a flowchart illustrating a method 2000 that supports active participation of a reflective surface in beam selection in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 2005, the method may include transmitting, to a reconfigurable reflective surface, an indication of resources for monitoring for one or more signals from a second wireless device, where the one or more signals relates to measurement information pertaining to a wireless channel between the second wireless device and the reconfigurable reflective surface. The operations of 2005 may be performed in accordance with examples as disclosed herein. In some examples, aspects of the operations of 2005 may be performed by a base station control signaling manager 1225 as described with reference to FIG. 12.

At 2010, the method may include receiving a resource identification that is indicative of a set of weights for a set of multiple reflective elements of the reconfigurable reflective surface based on the one or more signals. The operations of 2010 may be performed in accordance with examples as disclosed herein. In some examples, aspects of the operations of 2010 may be performed by a RIS manager 1230 as described with reference to FIG. 12.

Figure 21:
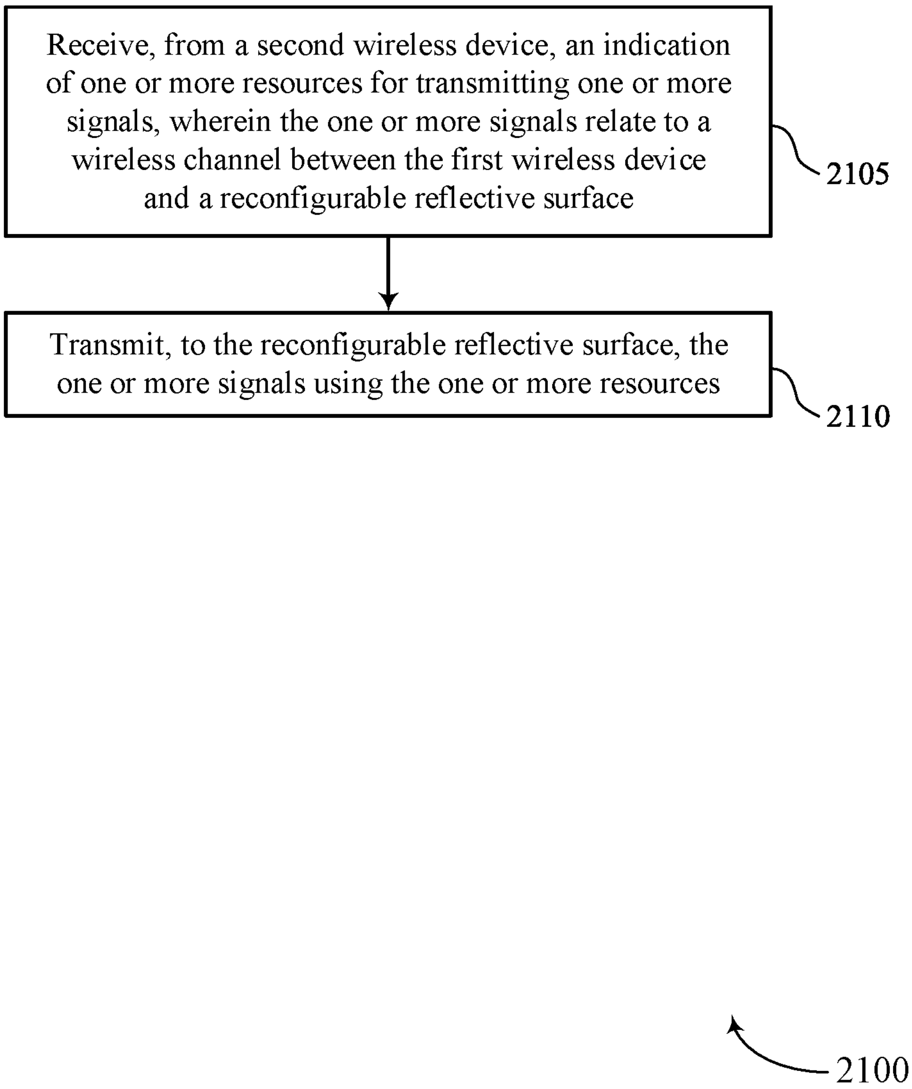

FIG. 21 shows a flowchart illustrating a method 2100 that supports active participation of a reflective surface in beam selection in accordance with aspects of the present disclosure. The operations of the method 2100 may be implemented by a UE or its components as described herein. For example, the operations of the method 2100 may be performed by a UE 115 as described with reference to FIGS. 1 through 5 and 14 through 17. In some examples, a UE may execute a set of instructions to control the functional elements of the UE to perform the described functions. Additionally, or alternatively, the UE may perform aspects of the described functions using special-purpose hardware.

At 2105, the method may include receiving, from a second wireless device, an indication of one or more resources for transmitting one or more signals, where the one or more signals relate to a wireless channel between the first wireless device and a reconfigurable reflective surface. The operations of 2105 may be performed in accordance with examples as disclosed herein. In some examples, aspects of the operations of 2105 may be performed by a UE control signaling manager 1625 as described with reference to FIG. 16.

At 2110, the method may include transmitting, to the reconfigurable reflective surface, the one or more signals using the one or more resources. The operations of 2110 may be performed in accordance with examples as disclosed herein. In some examples, aspects of the operations of 2110 may be performed by a UE channel measurement manager 1630 as described with reference to FIG. 16.

The following provides an overview of aspects of the present disclosure:

Aspect 1: A method for wireless communication at a reconfigurable reflective surface, comprising: receiving one or more signals from a first wireless device; determining, based at least in part on the one or more signals, measurement information pertaining to a wireless channel between the reconfigurable reflective surface and the first wireless device; and determining, based at least in part on the measurement information, a set of weights for a plurality of reflective elements of the reconfigurable reflective surface to be used in reflecting communications between the first wireless device and a second wireless device.

Aspect 2: The method of aspect 1, further comprising: determining, based at least in part on the one or more signals, a first spatial resource for the first wireless device to use in communicating with the second wireless device via the reconfigurable reflective surface, and a second spatial resource for the reconfigurable reflective surface to use for the communications that are from the second wireless device to the first wireless device via the reconfigurable reflective surface; and indicating, to at least one of the first wireless device or the second wireless device, a resource identification that is indicative of at least one of the first spatial resource, the second spatial resource, or the set of weights.

Aspect 3: The method of any of aspects 1 through 2, wherein determining the set of weights further comprises: determining, based at least in part on the one or more signals, a first direction for the first wireless device to use in communicating with the second wireless device via the reconfigurable reflective surface, or a second direction for the reconfigurable reflective surface to use for the communications that are from the second wireless device to the first wireless device via the reconfigurable reflective surface, wherein the set of weights for the plurality of reflective elements is based at least in part on the first direction and the second direction.

Aspect 4: The method of any of aspects 1 through 3, further comprising: receiving, from the second wireless device, an acceptance indication associated with the set of weights for at least the plurality of reflective elements; and relaying the communications between the first wireless device and the second wireless device using the set of weights.

Aspect 5: The method of any of aspects 1 through 4, wherein receiving the one or more signals from the first wireless device further comprises: receiving a measurement report from the first wireless device.

Aspect 6: The method of aspect 5, wherein determining the measurement information pertaining to the wireless channel between the reconfigurable reflective surface and the first wireless device further comprises: determining the measurement information based at least in part on information included in the measurement report.

Aspect 7: The method of any of aspects 5 through 6, wherein the measurement report is based on a multi-shot channel state information reference signal measurement triggered by a downlink control information from the second wireless device, the measurement report including reference signal received power measurements for respective shots of a channel state information reference signal.

Aspect 8: The method of any of aspects 5 through 7, wherein receiving the one or more signals from the first wireless device further comprises: receiving the measurement report via an uplink control channel message or an uplink shared channel message from the first wireless device on time domain and frequency domain resources previously provided to the reconfigurable reflective surface.

Aspect 9: The method of any of aspects 5 through 8, wherein receiving the one or more signals from the first wireless device further comprises: receiving the measurement report via a dedicated control channel between the first wireless device and the reconfigurable reflective surface.

Aspect 10: The method of aspect 9, further comprising: monitoring a plurality of dedicated control channels that are each between respective first wireless devices and the reconfigurable reflective surface, the dedicated control channel between the first wireless device and the reconfigurable reflective surface being one of the plurality of dedicated control channels.

Aspect 11: The method of any of aspects 9 through 10, wherein the measurement report includes an identification of the first wireless device.

Aspect 12: The method of any of aspects 1 through 11, wherein receiving the one or more signals from the first wireless device further comprises: receiving the one or more signals as one or more sounding reference signals on a set of uplink transmission resources reserved for supporting the reconfigurable reflective surface in deriving the set of weights.

Aspect 13: The method of aspect 12, wherein determining the measurement information pertaining to the wireless channel between the reconfigurable reflective surface and the first wireless device further comprises: measuring the one or more sounding reference signals; and deriving the measurement information from the measuring.

Aspect 14: The method of any of aspects 12 through 13, wherein each of the one or more sounding reference signals corresponds to a transmit beam from the first wireless device.

Aspect 15: The method of any of aspects 1 through 14, further comprising: receiving, from the second wireless device, an override indication associated with the set of weights for at least the plurality of reflective elements; and updating the set of weights for at least the plurality of reflective elements of the reconfigurable reflective surface based at least in part on the override indication.

Aspect 16: The method of aspect 15, further comprising: receiving one or more additional signals from the second wireless device, wherein updating the set of weights is further based at least in part on the one or more additional signals.

Aspect 17: The method of any of aspects 1 through 16, wherein the set of weights for at least the plurality of reflective elements comprise passive multiple-input multiple-output weights.

Aspect 18: The method of any of aspects 1 through 17, wherein each weight of the set of weights maps a control voltage for a reflective element of the plurality of reflective elements.

Aspect 19: A method for wireless communication at a first wireless device, comprising: transmitting, to a reconfigurable reflective surface, an indication of resources for monitoring for one or more signals from a second wireless device, wherein the one or more signals relates to measurement information pertaining to a wireless channel between the second wireless device and the reconfigurable reflective surface; and receiving a resource identification that is indicative of a set of weights for a plurality of reflective elements of the reconfigurable reflective surface based at least in part on the one or more signals.

Aspect 20: The method of aspect 19, wherein the resource identification further indicates at least one of a first spatial resource for the first wireless device to use in communicating with the second wireless device via the reconfigurable reflective surface or a second spatial resource for the reconfigurable reflective surface to use for communications that are from the second wireless device to the first wireless device via the reconfigurable reflective surface.

Aspect 21: The method of any of aspects 19 through 20, wherein the wireless channel is a first wireless channel, the method further comprising: transmitting, to the reconfigurable reflective surface, one or more additional signals indicating information related to a second wireless channel between the first wireless device or a third wireless device and the reconfigurable reflective surface.

Aspect 22: The method of any of aspects 19 through 21, further comprising: transmitting, to the reconfigurable reflective surface, an override indication associated with the resource identification.

Aspect 23: The method of any of aspects 19 through 22, further comprising: transmitting downlink control information to the second wireless device to trigger one or more channel state information reference signal measurements at the second wireless device, wherein the one or more signals is based at least in part on the one or more channel state information reference signal measurements.

Aspect 24: A method for wireless communication at a first wireless device, comprising: receiving, from a second wireless device, an indication of one or more resources for transmitting one or more signals, wherein the one or more signals relate to a wireless channel between the first wireless device and a reconfigurable reflective surface; and transmitting, to the reconfigurable reflective surface, the one or more signals using the one or more resources.

Aspect 25: The method of aspect 24, wherein transmitting the one or more signals further comprises: transmitting a measurement report to the reconfigurable reflective surface.

Aspect 26: The method of aspect 25, further comprising: measuring the wireless channel using a multi-shot channel state information reference signal measurement triggered by a downlink control information from the second wireless device, the measurement report including reference signal received power measurements for respective shots of a channel state information reference signal.

Aspect 27: The method of any of aspects 25 through 26, further comprising: measuring the wireless channel using a sounding reference signal.

Aspect 28: The method of any of aspects 24 through 27, further comprising: receiving a resource identification from the reconfigurable reflective surface, wherein transmitting the one or more signals is based at least in part on the resource identification.

Aspect 29: An apparatus for wireless communication at a reconfigurable reflective surface, comprising a processor; memory coupled with the processor; and instructions stored in the memory and executable by the processor to cause the apparatus to perform a method of any of aspects 1 through 18.

Aspect 30: An apparatus for wireless communication at a reconfigurable reflective surface, comprising at least one means for performing a method of any of aspects 1 through 18.

Aspect 31: A non-transitory computer-readable medium storing code for wireless communication at a reconfigurable reflective surface, the code comprising instructions executable by a processor to perform a method of any of aspects 1 through 18.

Aspect 32: An apparatus for wireless communication at a first wireless device, comprising a processor; memory coupled with the processor; and instructions stored in the memory and executable by the processor to cause the apparatus to perform a method of any of aspects 19 through 23.

Aspect 33: An apparatus for wireless communication at a first wireless device, comprising at least one means for performing a method of any of aspects 19 through 23.

Aspect 34: A non-transitory computer-readable medium storing code for wireless communication at a first wireless device, the code comprising instructions executable by a processor to perform a method of any of aspects 19 through 23.

Aspect 35: An apparatus for wireless communication at a first wireless device, comprising a processor; memory coupled with the processor; and instructions stored in the memory and executable by the processor to cause the apparatus to perform a method of any of aspects 24 through 28.

Aspect 36: An apparatus for wireless communication at a first wireless device, comprising at least one means for performing a method of any of aspects 24 through 28.

Aspect 37: A non-transitory computer-readable medium storing code for wireless communication at a first wireless device, the code comprising instructions executable by a processor to perform a method of any of aspects 24 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a reconfigurable reflective surface, comprising:

receiving one or more signals from a first wireless device;

determining, based at least in part on the one or more signals, measurement information pertaining to a wireless channel between the reconfigurable reflective surface and the first wireless device; and determining, based at least in part on the measurement information, a set of weights for a plurality of reflective elements of the reconfigurable reflective surface to be used in reflecting communications between the first wireless device and a second wireless device.

2. The method of claim 1, further comprising:

determining, based at least in part on the one or more signals, a first spatial resource for the first wireless device to use in communicating with the second wireless device via the reconfigurable reflective surface, and a second spatial resource for the reconfigurable reflective surface to use for the communications that are from the second wireless device to the first wireless device via the reconfigurable reflective surface; and indicating, to at least one of the first wireless device or the second wireless device, a resource identification that is indicative of at least one of the first spatial resource, the second spatial resource, or the set of weights.

3. The method of claim 1, wherein determining the set of weights further comprises:

determining, based at least in part on the one or more signals, a first direction for the first wireless device to use in communicating with the second wireless device via the reconfigurable reflective surface, or a second direction for the reconfigurable reflective surface to use for the communications that are from the second wireless device to the first wireless device via the reconfigurable reflective surface, wherein the set of weights for the plurality of reflective elements is based at least in part on the first direction and the second direction.

4. The method of claim 1, further comprising:

receiving, from the second wireless device, an acceptance indication associated with the set of weights for at least the plurality of reflective elements; and relaying the communications between the first wireless device and the second wireless device using the set of weights.

5. The method of claim 1, wherein receiving the one or more signals from the first wireless device further comprises:

receiving a measurement report from the first wireless device; and determining the measurement information based at least in part on information included in the measurement report.

6. The method of claim 5, wherein the measurement report is based on a multi-shot channel state information reference signal measurement triggered by a downlink control information from the second wireless device, the measurement report including reference signal received power measurements for respective shots of a channel state information reference signal.

7. The method of claim 5, wherein receiving the one or more signals from the first wireless device further comprises:

receiving the measurement report via an uplink control channel message or an uplink shared channel message from the first wireless device on time domain and frequency domain resources previously provided to the reconfigurable reflective surface.

8. The method of claim 5, wherein receiving the one or more signals from the first wireless device further comprises:

receiving the measurement report via a dedicated control channel between the first wireless device and the reconfigurable reflective surface; and monitoring a plurality of dedicated control channels that are each between respective first wireless devices and the reconfigurable reflective surface, the dedicated control channel between the first wireless device and the reconfigurable reflective surface being one of the plurality of dedicated control channels, wherein the measurement report includes an identification of the first wireless device.

9. The method of claim 1, wherein receiving the one or more signals from the first wireless device further comprises:

receiving the one or more signals as one or more sounding reference signals on a set of uplink transmission resources reserved for supporting the reconfigurable reflective surface in deriving the set of weights;

measuring the one or more sounding reference signals; and deriving the measurement information from the measuring, wherein each of the one or more sounding reference signals corresponds to a transmit beam from the first wireless device.

10. The method of claim 1, further comprising:

receiving, from the second wireless device, an override indication associated with the set of weights for at least the plurality of reflective elements;

updating the set of weights for at least the plurality of reflective elements of the reconfigurable reflective surface based at least in part on the override indication; and receiving one or more additional signals from the second wireless device, wherein updating the set of weights is further based at least in part on the one or more additional signals.

11. The method of claim 1, wherein the set of weights for at least the plurality of reflective elements comprise passive multiple-input multiple-output weights.

12. The method of claim 1, wherein each weight of the set of weights maps a control voltage for a reflective element of the plurality of reflective elements.

13. An apparatus for wireless communication at a reconfigurable reflective surface, comprising:

one or more processors;

one or more memories coupled with the one or more processors; and instructions stored in the one or more memories and executable by the one or more processors to cause the apparatus to:

receive one or more signals from a first wireless device;

determine, based at least in part on the one or more signals, measurement information pertaining to a wireless channel between the reconfigurable reflective surface and the first wireless device; and determine, based at least in part on the measurement information, a set of weights for a plurality of reflective elements of the reconfigurable reflective surface to be used in reflecting communications between the first wireless device and a second wireless device.

14. The apparatus of claim 13, wherein the instructions are further executable by the one or more processors to cause the apparatus to:

determine, based at least in part on the one or more signals, a first spatial resource for the first wireless device to use in communicating with the second wireless device via the reconfigurable reflective surface, and a second spatial resource for the reconfigurable reflective surface to use for the communications that are from the second wireless device to the first wireless device via the reconfigurable reflective surface; and indicate, to at least one of the first wireless device or the second wireless device, a resource identification that is indicative of at least one of the first spatial resource, the second spatial resource, or the set of weights.

15. The apparatus of claim 13, wherein the instructions to determine the set of weights are further executable by the one or more processors to cause the apparatus to:

determine, based at least in part on the one or more signals, a first direction for the first wireless device to use in communicating with the second wireless device via the reconfigurable reflective surface, or a second direction for the reconfigurable reflective surface to use for the communications that are from the second wireless device to the first wireless device via the reconfigurable reflective surface, wherein the set of weights for the plurality of reflective elements is based at least in part on the first direction and the second direction.

16. The apparatus of claim 13, wherein the instructions are further executable by the one or more processors to cause the apparatus to:

receive, from the second wireless device, an acceptance indication associated with the set of weights for at least the plurality of reflective elements; and relay the communications between the first wireless device and the second wireless device using the set of weights.

17. The apparatus of claim 13, wherein the instructions to receive the one or more signals from the first wireless device are further executable by the one or more processors to cause the apparatus to:

receive a measurement report from the first wireless device; and determine the measurement information based at least in part on information included in the measurement report.

18. The apparatus of claim 17, wherein the instructions to receive the one or more signals from the first wireless device are further executable by the one or more processors to cause the apparatus to:

receive the measurement report via a dedicated control channel between the first wireless device and the reconfigurable reflective surface; and monitor a plurality of dedicated control channels that are each between respective first wireless devices and the reconfigurable reflective surface, the dedicated control channel between the first wireless device and the reconfigurable reflective surface being one of the plurality of dedicated control channels, wherein the measurement report includes an identification of the first wireless device.

19. The apparatus of claim 13, wherein the instructions are further executable by the one or more processors to cause the apparatus to:

receive, from the second wireless device, an override indication associated with the set of weights for at least the plurality of reflective elements;

update the set of weights for at least the plurality of reflective elements of the reconfigurable reflective surface based at least in part on the override indication; and receive one or more additional signals from the second wireless device, wherein updating the set of weights is further based at least in part on the one or more additional signals.

20. A non-transitory computer-readable medium storing code for wireless communication at a reconfigurable reflective surface, the code comprising instructions executable by one or more processors to:

receive one or more signals from a first wireless device;

determine, based at least in part on the one or more signals, measurement information pertaining to a wireless channel between the reconfigurable reflective surface and the first wireless device; and determine, based at least in part on the measurement information, a set of weights for a plurality of reflective elements of the reconfigurable reflective surface to be used in reflecting communications between the first wireless device and a second wireless device.

* * * * *